(12) United States Patent
Ohta et al.

(10) Patent No.: US 7,936,811 B2
(45) Date of Patent: May 3, 2011

(54) MODULATION APPARATUS, MODULATION METHOD, AND DEMODULATION APPARATUS

(75) Inventors: Genichiro Ohta, Kanagawa (JP); Daichi Imamura, Kanagawa (JP); Keiji Takakusaki, Kanagawa (JP); Mitsuru Uesugi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 759 days.

(21) Appl. No.: 11/597,420

(22) PCT Filed: May 24, 2005

(86) PCT No.: PCT/JP2005/009442
§ 371 (c)(1),
(2), (4) Date: Jun. 25, 2007

(87) PCT Pub. No.: WO2005/117313
PCT Pub. Date: Dec. 8, 2005

(65) Prior Publication Data
US 2007/0286301 A1    Dec. 13, 2007

(30) Foreign Application Priority Data
May 25, 2004 (JP) .................... 2004-155153
Jul. 13, 2004 (JP) .................... 2004-206391

(51) Int. Cl.
*H04L 27/00* (2006.01)
*H04L 25/03* (2006.01)

(52) U.S. Cl. ........ 375/229; 375/295; 375/285; 375/316; 375/296

(58) Field of Classification Search .......... 375/229–236, 375/295, 377, 296, 285
See application file for complete search history.

(56) References Cited

U.S. PATENT DOCUMENTS

| 4,123,755 | A | * | 10/1978 | Fishbein et al. | ............. | 342/203 |
| 5,583,887 | A | * | 12/1996 | Murata et al. | ............. | 375/229 |
| 5,781,076 | A | * | 7/1998 | Iwamatsu et al. | ............. | 332/103 |
| 6,091,781 | A | | 7/2000 | Mujtaba | | |

(Continued)

FOREIGN PATENT DOCUMENTS

JP    11239189    8/1999

(Continued)

OTHER PUBLICATIONS

Jouko Vankka, "A Multicarrier QAM Modulator", Jan. 2000, IEEE Transactions on Circuits and Systems-II: Analog and Digital Signal Processing, pp. 1-10.*

(Continued)

*Primary Examiner* — David C Payne
*Assistant Examiner* — Linda Wong
(74) *Attorney, Agent, or Firm* — Dickinson Wright PLLC

(57) ABSTRACT

A modulating device capable of generating an OFDM signal and having a drastically improved frequency use efficiency. The modulating device has modulators (6, 8 (11, 13, 106, 108, 111, 113)) for modulating a signal to be modulated and having a Nyquist roll-off frequency characteristic with a carrier frequency having a difference two times the Nyquist frequency and combiners (10(15, 110, 115)) for generating modulation output having a speed two times that of the signal to demodulated and the same Nyquist roll-off slope as the signal to be modulated by combining the outputs of the modulators (6, 8 (11, 13, 106, 108, 111, 113)). Thus a double speed wave can be superposed on the same frequency without varying the roll-off slope of the Nyquist characteristic, and therefore an OFDM signal (19) having a drastically improved frequency use efficiency is provided.

7 Claims, 15 Drawing Sheets

U.S. PATENT DOCUMENTS

| | | | |
|---|---|---|---|
| 6,490,010 B1 * | 12/2002 | Shibuya et al. | 348/735 |
| 6,507,625 B2 * | 1/2003 | Iwamatsu et al. | 375/316 |
| 7,076,168 B1 * | 7/2006 | Shattil | 398/76 |
| 7,333,153 B2 * | 2/2008 | Hartson et al. | 348/608 |
| 2002/0131529 A1 * | 9/2002 | Iwamatsu et al. | 375/324 |
| 2005/0111568 A1 * | 5/2005 | Adachi | 375/295 |
| 2006/0233282 A1 * | 10/2006 | Ota et al. | 375/308 |

FOREIGN PATENT DOCUMENTS

JP    2003134069    5/2003

OTHER PUBLICATIONS

PCT International Search Report dated Sep. 6, 2005.

* cited by examiner

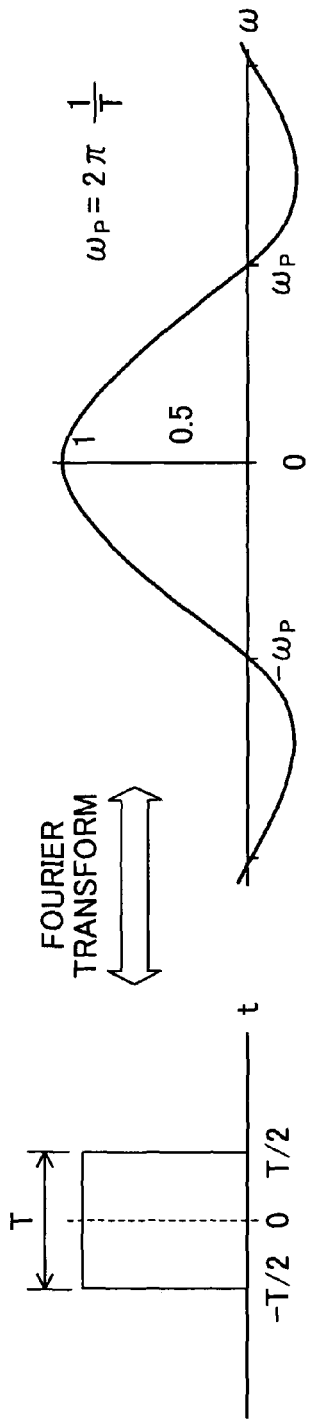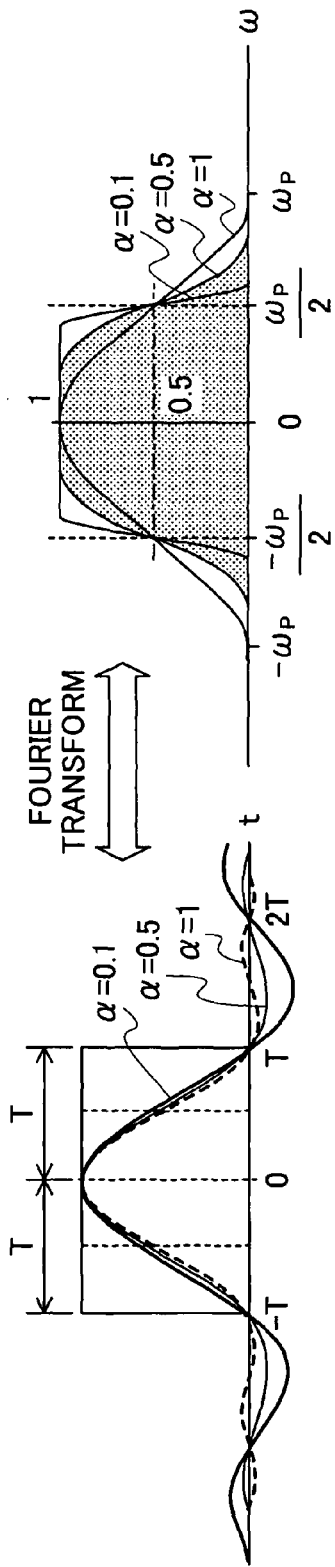

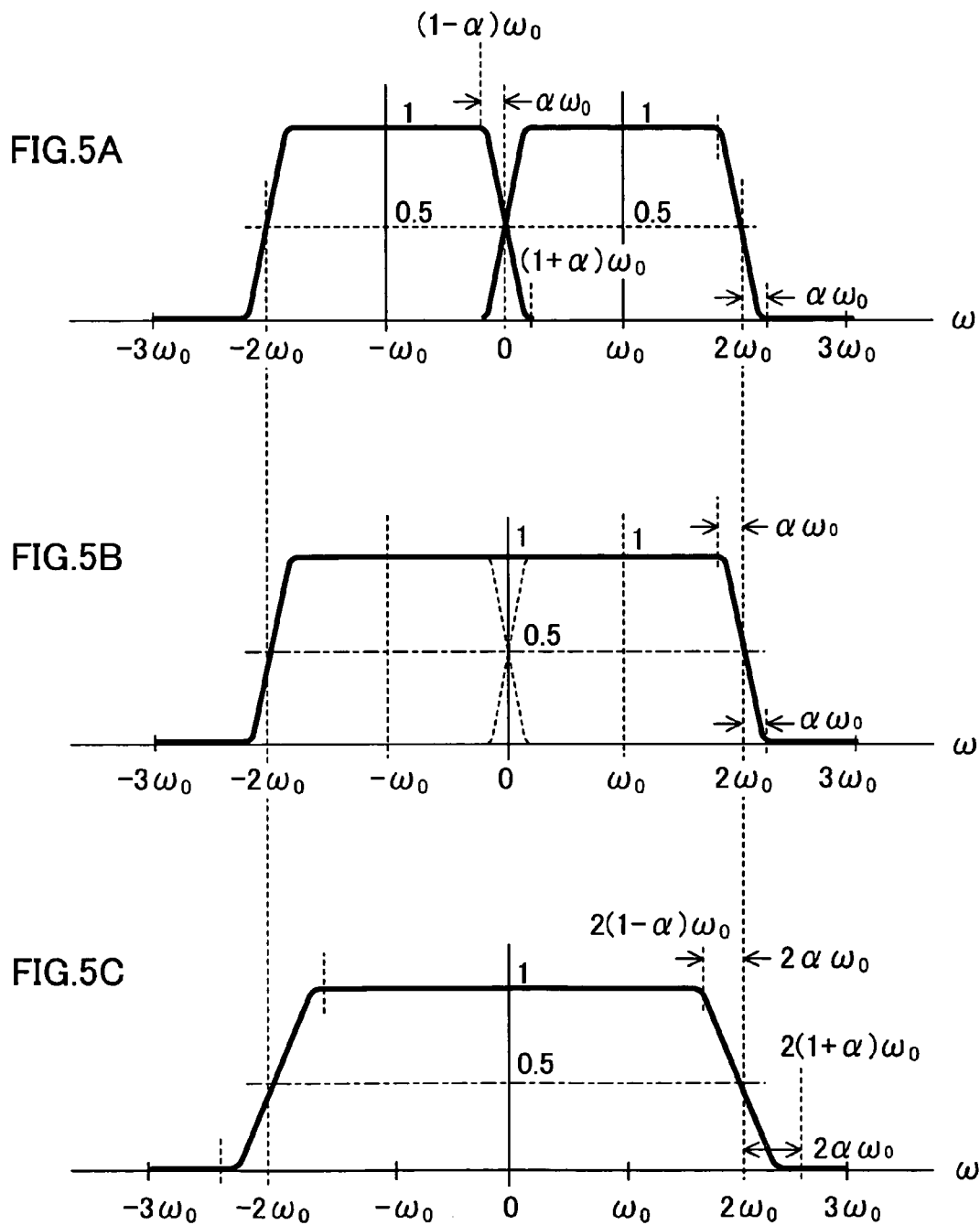

FIG.6A  $\alpha < 1$
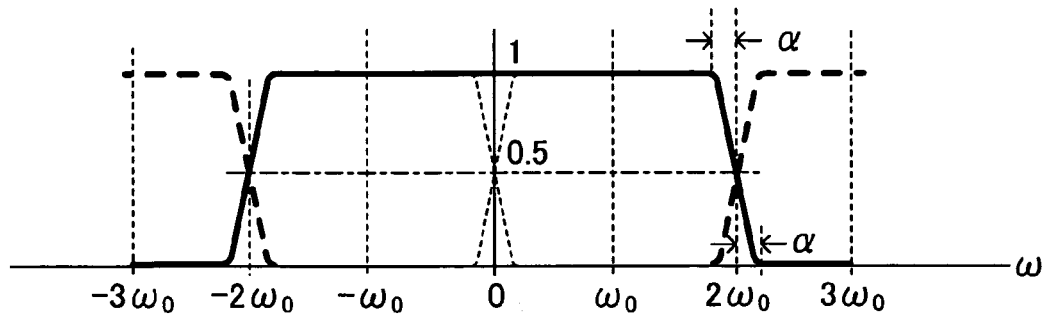
FIG.6B  $\alpha = 1$
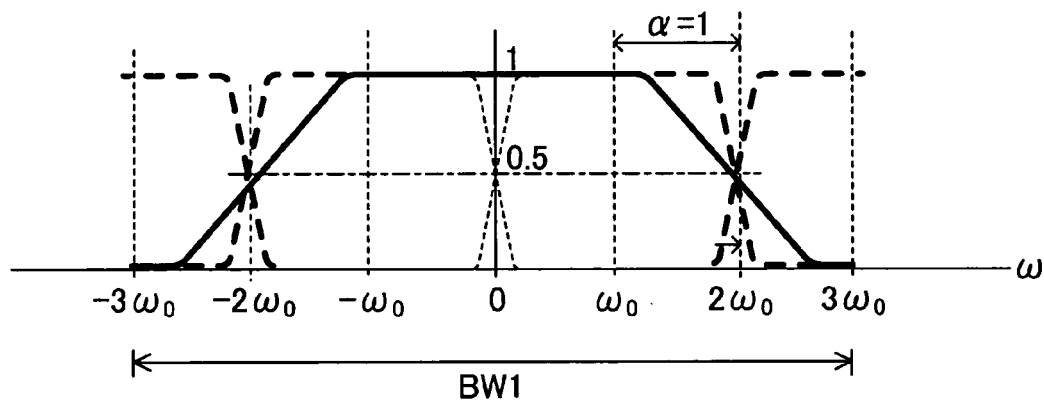
FIG.6C  $\alpha = 1$
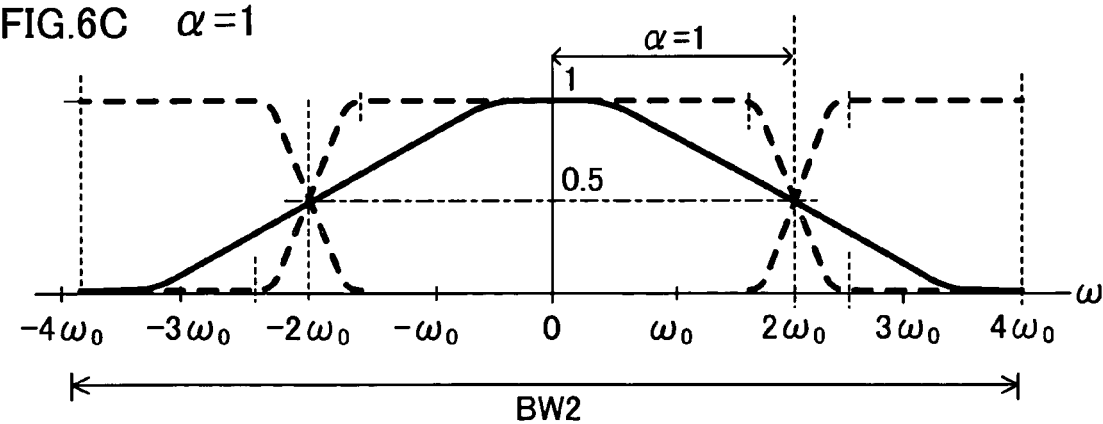

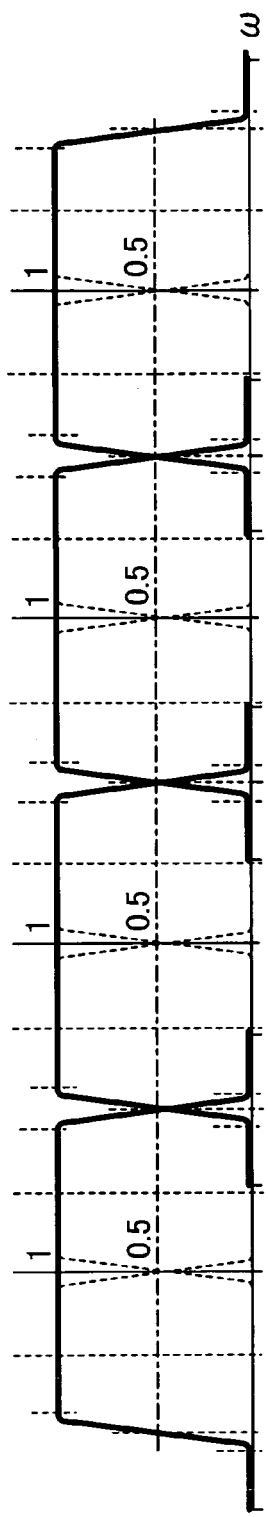
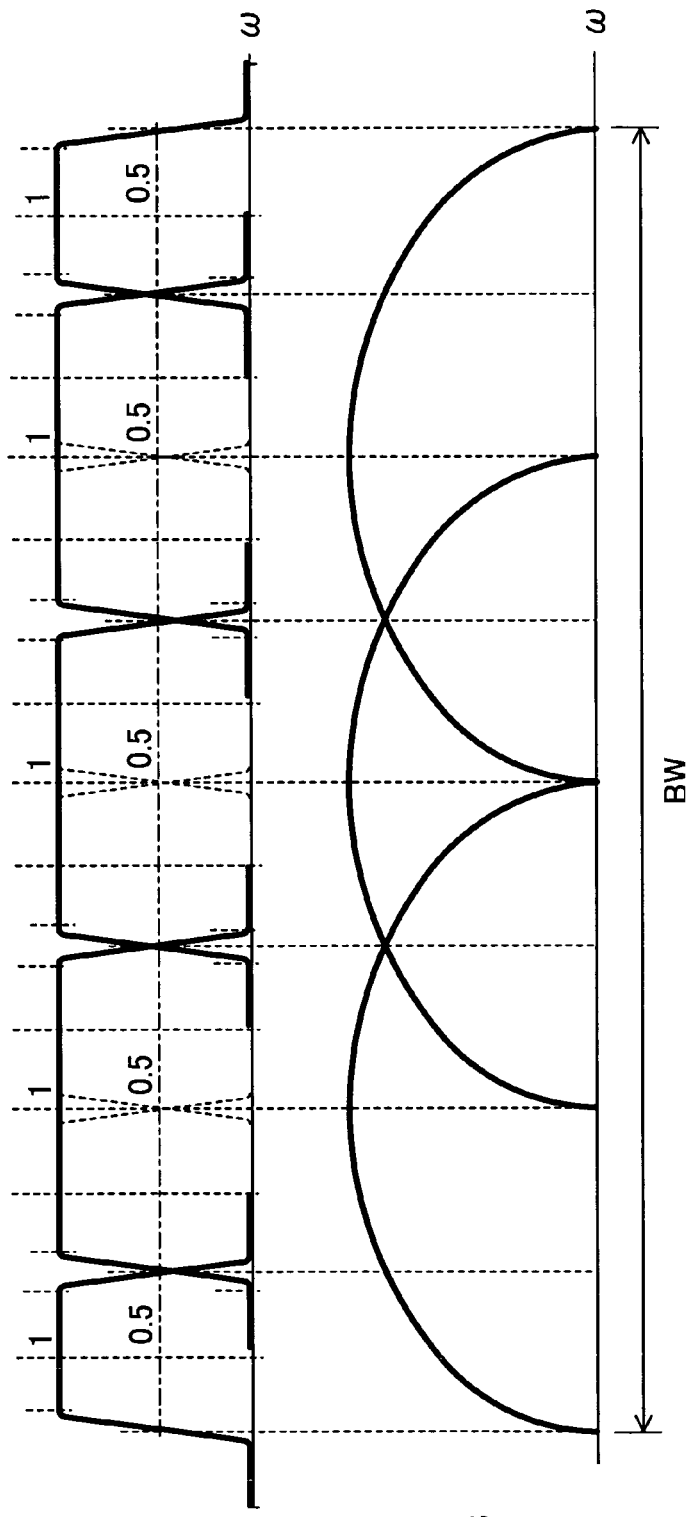
FIG.7A  FIG.7B  FIG.7C

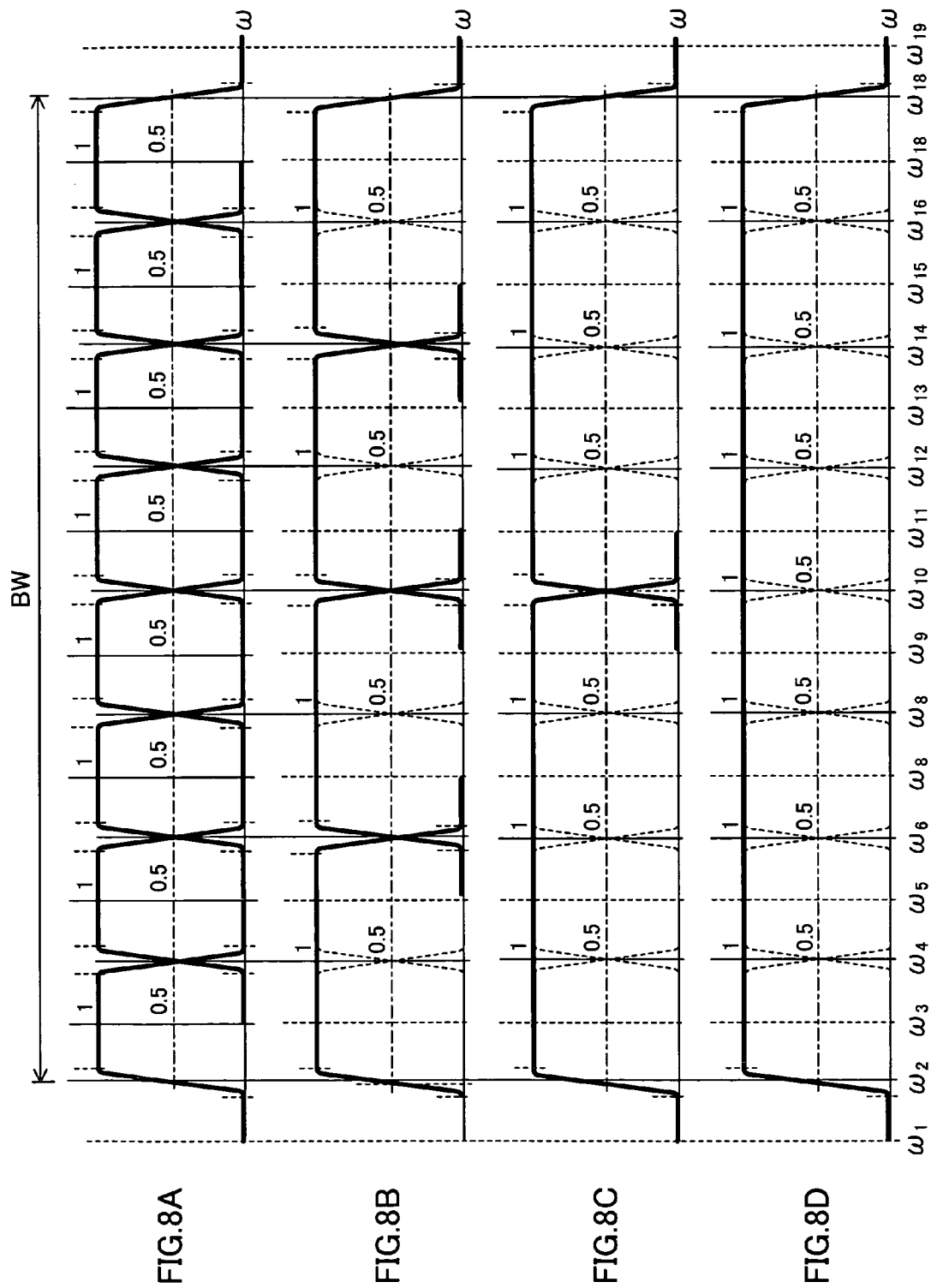

US 7,936,811 B2

MODULATION APPARATUS, MODULATION METHOD, AND DEMODULATION APPARATUS

TECHNICAL FIELD

The present invention relates to a modulation apparatus, modulation method and demodulation apparatus, and a technology for improving efficiency of frequency use and transmitting data as much as possible in limited frequency band.

BACKGROUND ART

Conventionally, wireless communication technologies have remarkably progressed and spread, and it is always desired to cultivate frequency resources. In 2010, it is expected that people use various wireless multimedia equipments, and, as a result, shortage of frequencies becomes a problem in various situations.

Predecessors have developed various modulation schemes, for example, ASK, PSK, CDMA and OFDM in order to improve efficiency of frequency use. A SSB (Single Side Band) scheme as disclosed in Patent Documents 1 and 2, for example, has been modified.

The modulation scheme that is said to have the highest efficiency of frequency use at present is a combination of OFDM and quadrature modulation, and its data transmission rate is 2 bit/sec/Hz.

Patent Document 1: U.S. Pat. No. 6,091,781 (Japanese Patent Application Laid-Open No. HEI11-239189)
Patent Document 2: Japanese Patent Application Laid-Open No. 2003-134069

DISCLOSURE OF INVENTION

Problems to be Solved by the Invention

With the OFDM scheme, subcarriers can be arranged overlapped by half with one another, so that efficiency of frequency use increases. However, with the OFDM scheme, since an unshaped pulse sequence is used as an input signal, individual carriers forming an OFDM signal—subcarriers—require band twice the Nyquist frequency which is twice the pulse transmission rate. Therefore, it is an ideal to perform band limitation on a pulse wave and further improve efficiency of frequency use.

It is therefore an object of the present invention to provide a modulation apparatus and modulation method capable of forming an OFDM signal with substantially improved efficiency of frequency use, and a demodulation apparatus that demodulates the OFDM signal.

Means for Solving the Problem

One aspect of the modulation apparatus of the present invention adopts a configuration having: a modulation section that modulates a signal subject to modulation having a Nyquist roll-off frequency characteristic by a carrier frequency having a difference twice a Nyquist frequency; and a combination section that combines output of the modulation section and thereby obtains a modulation signal having a rate twice the signal subject to modulation and the same Nyquist roll-off inclination as the signal subject to modulation. According to this configuration, a multiplied rate wave can be superimposed on the same frequency without changing the roll-off inclination of the Nyquist characteristic, so that it is possible to suppress diffusion of a frequency bandwidth and transmit a large amount of data. As a result, it is possible to obtain a modulation signal (OFDM signal) with substantially improved efficiency of frequency use.

One aspect of the modulation apparatus of the present invention adopts a configuration having: a basic rate modulation section that modulates a first signal subject to modulation having a Nyquist roll-off frequency characteristic by a carrier frequency having a difference twice a Nyquist frequency and thereby forms a basic rate modulation signal; a $2^n$-fold rate modulation section that modulates a second signal subject to modulation having the same Nyquist roll-off characteristic as the first signal subject to modulation and a rate $2^n$ ($n \geq 2$) fold the first signal subject to modulation by a carrier frequency having a difference $2^{n+1}$ fold the Nyquist frequency and thereby forms a $2^n$-fold rate modulation signal; and a combination section that combines the basic rate modulation signal and $2^n$-fold rate modulation signal.

According to this configuration, it is possible to superimpose a $2^n$-fold rate modulation signal on the basic rate modulation signal without changing roll-off inclination of the Nyquist characteristic, so that, at a combination section, it is possible to prevent the frequency bandwidth from broadening, and obtain a modulation signal (OFDM signal) capable of transmitting a larger amount of data.

ADVANTAGEOUS EFFECT OF THE INVENTION

According to the present invention, it is possible to form an OFDM signal with substantially improved efficiency of frequency use compared to the prior art.

BRIEF DESCRIPTION OF DRAWINGS

FIG. 1A shows a pulse waveform in OFDM communication, FIG. 1B shows its frequency spectrum, FIG. 1C shows a frequency spectrum of a Nyquist roll-off pulse, and FIG. 1D shows a Nyquist roll-off pulse waveform;

FIG. 5A shows a state where Nyquist waves of symbol rate T are made adjacent, FIG. 5B shows a state where Nyquist waves of symbol rate T are combined, and FIG. 5C shows a state of a Nyquist wave of symbol rate T/2;

FIG. 6A shows a case where roll-off factor $\alpha<1$ according to the scheme of the present invention, FIG. 6B shows a case where roll-off factor $\alpha=1$ according to the scheme of the present invention, and FIG. 6C shows a case where roll-off factor $\alpha=1$ according to the conventional scheme;

FIG. 7A shows a filling method by subcarriers with an equal bandwidth using the present invention, FIG. 7B shows a filling method by a plurality of types of subcarriers using the present invention; and FIG. 7C shows a filling method of subcarriers in conventional OFDM;

FIG. 8A shows one of filling methods by subcarriers with the equal bandwidth, FIG. 8B shows a first example of subcarriers that can be superimposed by the present invention, FIG. 8C shows a second example of subcarriers that can be superimposed by the present invention, and FIG. 8D shows a third example of subcarriers that can be superimposed by the present invention;

BEST MODE FOR CARRYING OUT THE INVENTION

(1) Principle

The scheme of the highest efficiency of frequency use in the current modulation schemes is OFDM (Orthogonal Frequency Division Multiplexing). However, in OFDM, since waveform shaping is not performed on an input pulse signal, the frequency bandwidth that individual carrier—called subcarrier—requires is twice the Nyquist frequency. The present invention provides a modulation scheme that uses a signal group subjected to Nyquist filter with high efficiency of frequency use and that improves subcarrier density by using the Viete formula, and substantially improves efficiency of frequency use of OFDM.

First, the principle of the present invention will be described.

Band limitation of a pulse wave in OFDM will be briefly described using FIG. 1.

When symbol period T (sec) is as shown in FIG. 1A, frequency characteristic $S_{OFDM}(\omega)$ of a pulse wave in OFDM communication is expressed by the equation below, and its pulse waveform is as shown in FIG. 1B.

$$S_{OFDM}(\omega) = \left| \frac{\sin\frac{\pi\omega}{T}}{\frac{\pi\omega}{T}} \right| \quad (1)$$

It can been seen that a spectrum component surges infinitely, but a width of a center part that is a main component is $4\pi/T$. Here, the bandwidth expressed by $\omega_p$ is generally referred to as the Nyquist band.

On the other hand, in modulation used in general digital communication, by removing the high frequency component of the pulse to the maximum, the necessary frequency component is suppressed. The filter used for this is a Nyquist roll-off filter. FIG. 1D shows the waveform after the filter, and the period is extended to 2T. This signal $S_{Nyquist}(t)$ is expressed by the equation below.

$$s_{Nyquist}(t) = A(t)\frac{\sin\frac{\pi t}{T}}{\frac{\pi t}{T}}\frac{t\cos\alpha\frac{\pi t}{T}}{1-\left(\frac{2\alpha t}{T}\right)^2} \quad (2)$$

This signal can be obtained by Fourier transforming the spectrum characteristics determined by the curve of the frequency characteristics shown in FIG. 1C. The frequency bandwidth is expressed in the equation below when a compression rate referred to as roll-off factor $\alpha$ is used as shown in FIG. 1C.

$$\frac{2\pi}{T}(1+\alpha), \quad (3)$$
$$0 \leq \alpha \leq 1$$

It is required in the Nyquist frequency characteristic that a characteristic curve is odd symmetric at frequency of level 0.5, and frequency orthogonality can be ensured with a signal which uses this frequency as a symmetric axis and has the same frequency characteristic.

(1-1) Two symbols are accommodated in one symbol period. The inventors of the present invention first consider accommodating two symbols in one symbol period.

Figures 2A, 2B:
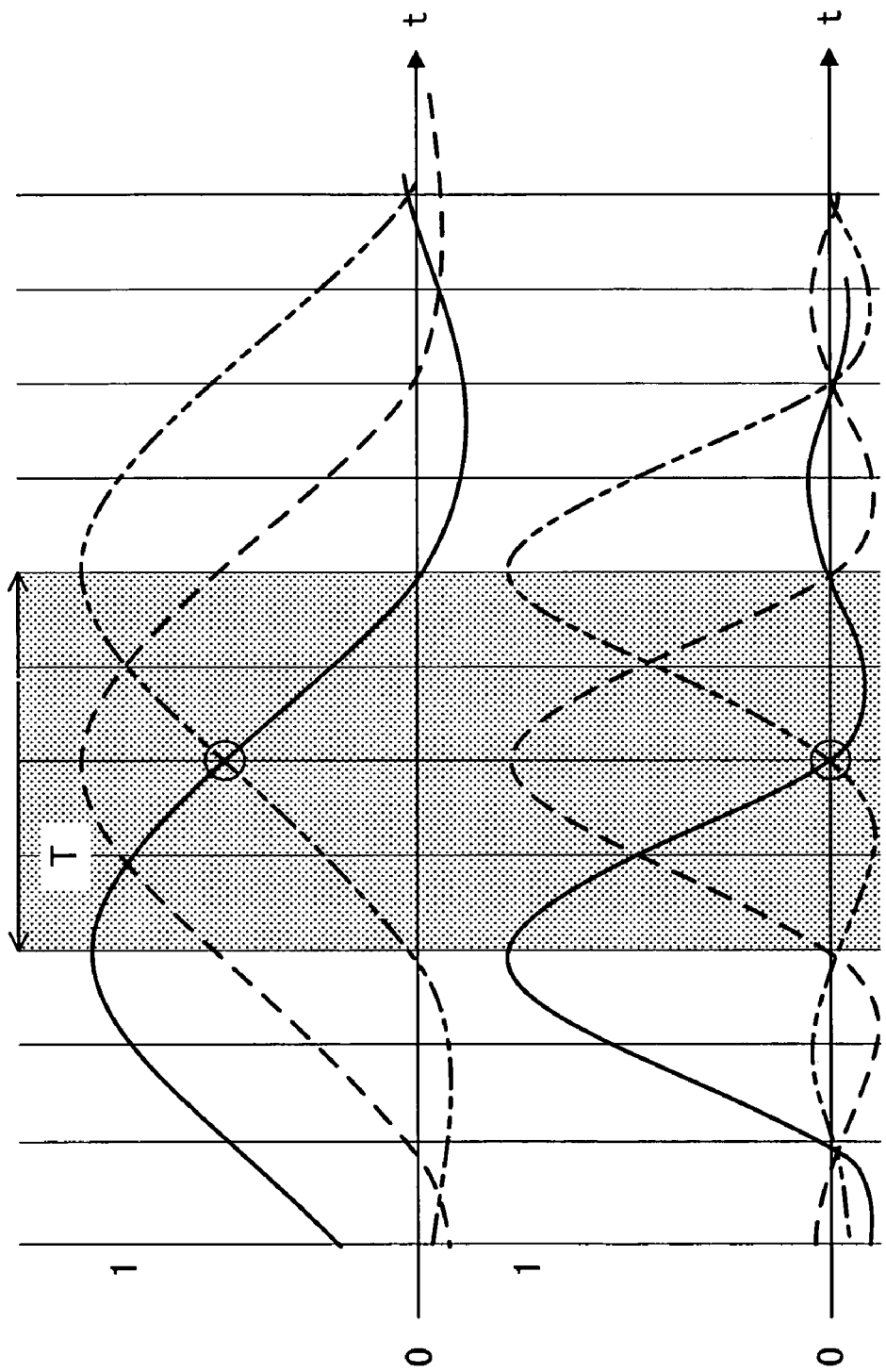
FIG. 2A shows a case where a Nyquist wave of period T is inserted at T/2.
FIG. 2B shows a case where a Nyquist wave of period T/2 is inserted at T/2.

As seen from FIG. 2A, in the Nyquist pulse, it is possible to arrange one symbol during symbol period T. This is because there is no null point that enables other pulses to be accommodated in symbol period T.

Therefore, with the present invention, $S_{Nyquist}(t)$ is multiplied by a cosine wave having the same period. By this means, the following equation can be obtained, and the state is as shown in FIG. 2B.

$$s_{Nyquist}(t)|_{\alpha=1} \times \cos\omega_0 t = A\frac{\sin 2\omega_0 t}{2\omega_0 t} \quad (4)$$

This signal has a null point in a period of symbol period T, so that it is possible to arrange a new Nyquist wave in the form of this signal at the null position.

This is one of the principles used in the present invention.

At this time, it is generally considered that the frequency bandwidth doubles.

(1-2) The band accommodating two symbols is narrowed. The present inventors have then thought of narrowing the band accommodating the symbols.

Figure 3:
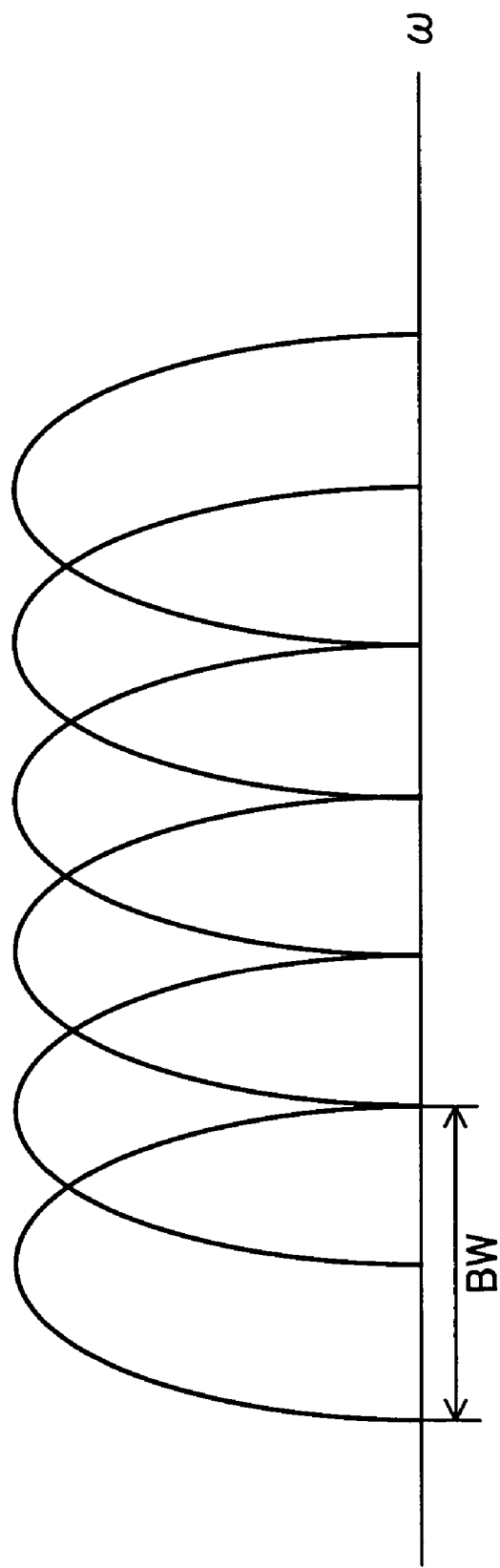
FIG. 3 shows arrangement of subcarriers of an OFDM signal.

The OFDM scheme refers to a communication scheme where, as shown in FIG. 3, subcarriers overlap with one another by half of the bandwidth BW on the frequency axis.

In the OFDM scheme, in order to use an unshaped pulse, it is not possible to narrow the band of individual subcarriers and frequency intervals between individual subcarriers.

Accordingly, a method of combining a Nyquist signal that suppresses increase of the band and realizes a two-fold transmission rate will be suggested.

Figure 4:
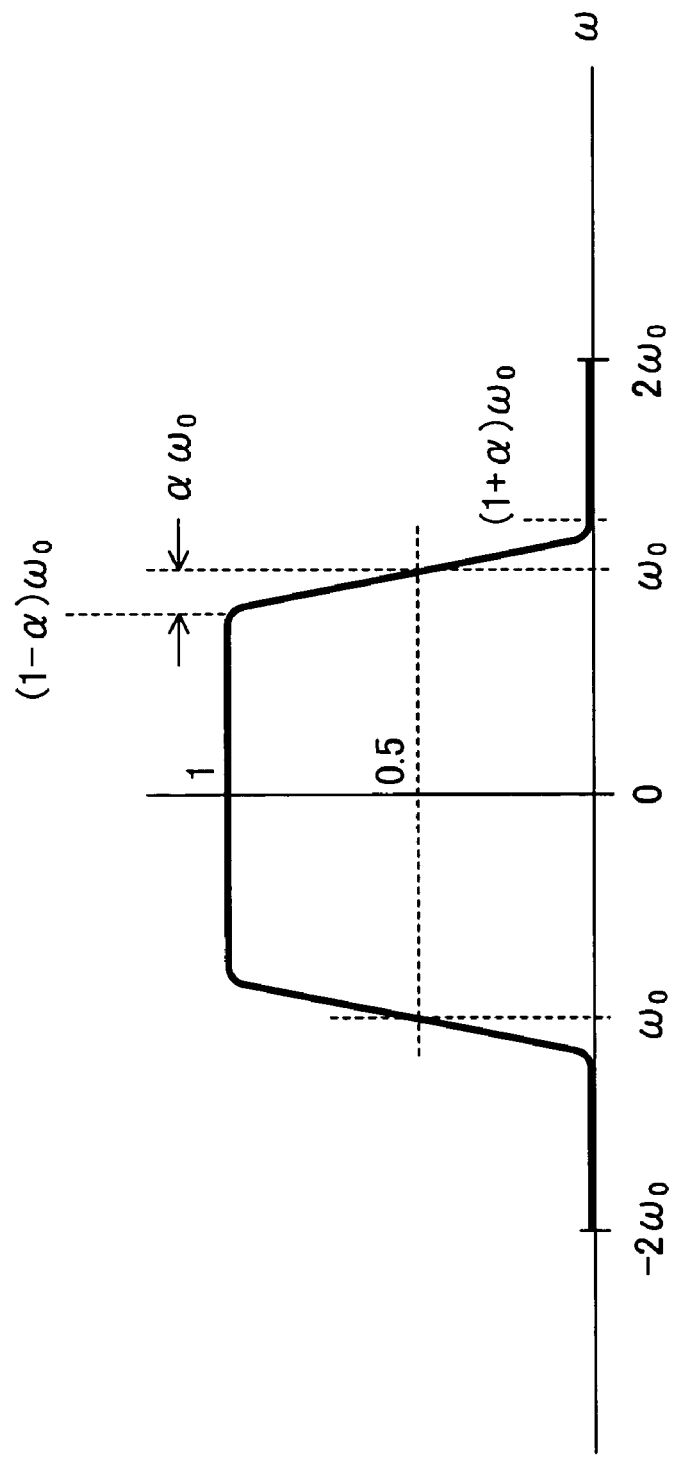
FIG. 4 illustrates a roll-off factor correction function.

First, roll-off factor $\alpha$ is defined as the equation below. In the following equation, $\sigma_0(t)$ is a function for correcting the roll-off factor (herein after, referred to as a roll-off factor correction function), and as shown in the solid line in FIG. 4. Here, the angular frequency location expressed with $\omega_0$ shows a place of the symmetric axis of Nyquist's vestigial symmetry theorem, and $\omega_0$ is referred to as the Nyquist frequency in this embodiment.

$$s_{Nyquist}(t) = A\frac{\sin\omega_0 t}{\omega_0 t}\sigma_0(t) \quad (5)$$
$$= A\frac{\sin\omega_0 t}{\omega_0 t}\left\{\frac{\omega_0}{\pi}\frac{\cos\alpha\omega_0 t}{1-\left(\frac{2\alpha\omega_0 t}{\pi}\right)^2}\right\}$$

where $$\sigma_0(t) = \frac{\omega_0}{\pi}\left[\frac{1}{1-\left(\frac{2\alpha\omega_0 t}{\pi}\right)^2}\right]$$

FIG. 5 shows a combination of two waves based on the definition of the frequency spectrum of the Nyquist signal.

The inclination of the Nyquist signal is odd symmetric at the middle point of the slope on the frequency axis. Therefore, if two Nyquist signals at the same symbol rate are overlapped as shown in FIG. 5A using this part as a symmetric axis, it is possible to separate two signals at the reception side.

On the other hand, it is obvious that the Nyquist signal having the rate twice the symbol rate of the individual Nyquist signal in FIG. 5A is as shown in FIG. 5C. There is a two-fold difference in the frequency band required for the slope part between FIG. 5A and FIG. 5C.

It is an object of the present invention to propose a method and apparatus that realizes the Nyquist signal with the slope part left as the inclination in FIG. 5A by combining two Nyquist signals without changing the arrangement in FIG. 5A, and with the symbol rate being double as shown in FIG. 5B.

First, the Nyquist signal shown in FIG. 5C is expressed by the equation below using roll-off correction function $\sigma_0(t)$.

$$s_{Nyquist-5C}(t) = A\frac{\sin 2\omega_0 t}{2\omega_0 t}\sigma_{0-4C}(t) \qquad (6)$$

$$= A\frac{\sin 2\omega_0 t}{2\omega_0 t}\left\{\frac{2\omega_0}{\pi} \frac{\cos 2\alpha\omega_0 t}{1-\left(\frac{4\alpha\omega_0 t}{\pi}\right)^2}\right\}$$

Next, the generation of the Nyquist signal in FIG. 5B will be described.

The basic equation of the Nyquist signal is as described above. When two of these Nyquist signals in which the carrier frequency is shifted by $2\omega_0$ are added, the following equation holds.

$$\begin{aligned}s_{Nyquist-5B}(t) &= A\frac{\sin 2\omega_0 t}{2\omega_0 t}\sigma_0(t)\cos(n-1)\omega_0 t + \\ &\quad A\frac{\sin 2\omega_0 t}{2\omega_0 t}\sigma_0(t)\cos(n+1)\omega_0 t \\ &= A\frac{\sin\omega_0 t}{\omega_0 t}\sigma_0(t)\{\cos(n-1)\omega_0 t + \cos(n+1)\omega_0 t\} \\ &= A\frac{\sin\omega_0 t}{\omega_0 t}\sigma_0(t)2\cos\omega_0 t\cos n\omega_0 t \\ &= 2A\frac{\sin 2\omega_0 t}{2\omega_0 t}\sigma_0(t)\cos n\omega_0 t \\ &\quad 2A\frac{\sin 2\omega_0 t}{2\omega_0 t}\left\{\frac{\omega_0}{\pi}\frac{\cos\alpha\omega_0 t}{1-\left(\frac{2\alpha\omega_0 t}{\pi}\right)^2}\right\}\cos n\omega_0 t\end{aligned} \qquad (7)$$

This equation (7) includes the same expression form as equation (4) and the above-described first principle of the present invention. Furthermore, equation (7) is expanded using the Viete formula.

Here, when n=0 in equation (7) in order to compare with FIG. 5C, the following equation holds, verifying that the inclination of the slope part is left as in FIG. 5A.

$$s_{Nyquist-5B}(t) = 2A\frac{\sin 2\omega_0 t}{2\omega_0 t}\left\{\frac{\omega_0}{\pi}\frac{\cos\alpha\omega_0 t}{1-\left(\frac{2\alpha\omega_0 t}{\pi}\right)^2}\right\} \qquad (8)$$

This result is compared with the spectrum of the Nyquist signal having the two-fold symbol rate according to the prior-art method.

FIG. 6 shows the spectrums where roll-off factor α is increased to 1. That is, FIG. 6A shows a case where roll-off factor α<1 according to the scheme of the present invention, FIG. 6B shows a case where roll-off factor α=1 according to the scheme of the present invention, and FIG. 6C shows a case where roll-off factor α=1 according to the conventional scheme.

As is clear from FIG. 6, compared to bandwidth BW2 of the Nyquist signal having the two-fold symbol rate according to the conventional scheme, according to the scheme of the present invention, when roll-off factor α=1, it requires 75 percentages of bandwidth BW1. Next, a configuration method of an OFDM wave of the present invention using the above-described principle is shown in FIG. 7 and FIG. 8.

FIG. 7A shows a filling method by subcarriers of equal bandwidth using the present invention, FIG. 7B shows a filling method by a plurality of types of subcarriers using the present invention, and FIG. 7C shows a filling method of subcarriers in prior-art OFDM.

FIG. 7 shows that, in prior-art OFDM accommodating n subcarriers, the scheme of the present invention can accommodate n+1 subcarriers. FIG. 7C shows a case where the number of subcarriers in prior-art OFDM is three. FIG. 7A shows a case of accommodating one more subcarrier—that is, four subcarriers—according to the scheme of the present invention. Further, FIG. 7B shows a method of embedding subcarriers of low rate, where each center frequency is made the same value as prior-art OFDM as far as possible.

FIG. 8 shows that a plurality of types of subcarriers can be overlapped using the present invention. FIG. 8A shows one filing method by subcarriers of equal bandwidth, FIG. 8B shows a first example of subcarriers that can be superimposed by the present invention, FIG. 8C shows a second example of subcarriers that can be superimposed by the present invention, and FIG. 8D shows a third example of subcarriers that can be superimposed by the present invention.

Here, FIGS. 8A, 8B, 8C and 8D show subcarriers having the same frequency curve at both ends, in which the rate doubles one after another. These signals are basically orthogonal and therefore can be multiplexed on the same frequency band. Therefore, unlike prior-art OFDM, it is possible to use the same frequency band in a multiplex manner, so that efficiency of frequency use can be substantially improved.

When the same state continues in high-rate data sequence, the rate becomes partially the same as low-rate data sequence. Therefore, in order to prevent the occurrence of the same state in the high-rate data sequence (that is, consecutive zeros), it is preferable to perform coding such as AMI (Alternate Mark Inversion) coding, HDBn (High Density Bipolar n), BnZS (Bipolar with n Zeros Substitution), 4B-3T (B: binary, T: ternary) and mBIC (m-ary complimentary) seen in a code conversion rule of a transmission system. In addition, CMI (Coded Mark Inversion) increases the code rate and therefore not preferable.

Furthermore, it is inevitable that the same state continues twice, so that it is necessary to use data sequences of a four-fold rate or more without using a sequence of the immediate multiplied rate.

Next, the principle of orthogonality in the present invention will be described. In the example of FIG. 8A, eight Nyquist waves of the basic rate are arranged at the same frequency intervals using the point where the roll-off frequency characteristic is 0.5 as reference of superimposition. Needless to say, the Nyquist waves are orthogonal at this point.

When the roll-off factor is $\alpha$, the Nyquist waves in this case can be expressed by the equation below from the above-described equation (6).

$$s_{Nyquist}(t)_m = A\frac{\sin\omega_0 t}{\omega_0 t}\sigma_0(t)\cos m\omega_0 t \qquad (9)$$

$$= A\frac{\sin\omega_0 t}{\omega_0 t}\left\{\frac{\omega_0}{\pi}\frac{\cos\alpha\omega_0 t}{1-\left(\frac{2\alpha\omega_0 t}{\pi}\right)^2}\right\}\cos m\omega_0 t$$

In equation (9), m is an integer for expressing carrier frequency as $m\omega_0(t)$, and expressed with the equation below.

$$m=2n+1, (n:0, \pm1, \pm2, \ldots) \qquad (10)$$

FIG. 8B shows the Nyquist wave of a rate twice the Nyquist wave in FIG. 8A, and is generated from the combination of two adjacent waves in FIG. 7A, and expressed with the equation below from the above-described equation (7).

$$2A\frac{\sin 2\omega_0 t}{2\omega_0 t}\left\{\frac{\omega_0}{\pi}\frac{\cos\alpha\omega_0 t}{1-\left(\frac{2\alpha\omega_0 t}{\pi}\right)^2}\right\}\cos m_2\omega_0 t \qquad (11)$$

In equation (11), $m_2$ is used for expressing carrier frequency as $m_2\omega_0(t)$ and expressed with the equation below.

$$m_2=2n+2+4k, (n:0, \pm1, \pm2, \ldots)(k:0, \pm1, \pm2, \ldots) \qquad (12)$$

The Nyquist wave in FIG. 8C has a four-fold rate of the Nyquist wave in FIG. 8A. The reason for the quadrupling is to prevent a decrease to a lower rate when consecutive zeros occur as described above.

FIG. 8C is generated from the combination of two adjacent waves in FIG. 8B and expressed with the equation below from the combination of equation (11).

$$2A\frac{\sin 8\omega_0 t}{8\omega_0 t}\left\{\frac{\omega_0}{\pi}\frac{\cos\alpha\omega_0 t}{1-\left(\frac{2\alpha\omega_0 t}{\pi}\right)^2}\right\}\cos m_4\omega_0 t \qquad (15)$$

In equation (13), $m_3$ is used for expressing a carrier frequency as $m_3\omega_0(t)$ and expressed with the equation below.

$$m_3=2n+4+8k, (n:0, \pm1, \pm2, \ldots)(k:0, \pm1, \pm2, \ldots) \qquad (14)$$

FIG. 8D shows a Nyquist wave of an eight-fold rate of the Nyquist wave in FIG. 8A and is generated from the combination of two adjacent waves in FIG. 8C and expressed with the equation below from the combination in equation (14).

$$2A\frac{\sin 4\omega_0 t}{4\omega_0 t}\left\{\frac{\omega_0}{\pi}\frac{\cos\alpha\omega_0 t}{1-\left(\frac{2\alpha\omega_0 t}{\pi}\right)^2}\right\}\cos m_3\omega_0 t \qquad (13)$$

In equation (15), $m_4$ is used for expressing a carrier frequency as $m_4\omega_0(t)$ and expressed with the equation below.

$$m_4=2n+8+16k, (n:0, \pm1, \pm2, \ldots)(k:0, \pm1, \pm2, \ldots) \qquad (16)$$

That is, a signal with p-fold rate of the Nyquist wave in FIG. 8A is expressed with the equation below.

$$2A\frac{\sin(2p)\omega_0 t}{(2p)\omega_0 t}\left\{\frac{\omega_0}{\pi}\frac{\cos\alpha\omega_0 t}{1-\left(\frac{2\alpha\omega_0 t}{\pi}\right)^2}\right\}\cos m_p\omega_0 t \qquad (17)$$

Then, in equation (17), $m_p$ is used for expressing a carrier frequency as $m_p\omega_0(t)$ and expressed with the equation below.

$$m_p=2n+p+2pk, (n:0, \pm1, \pm2, \ldots)(k:0, \pm1, \pm2, \ldots) \qquad (18)$$

Further, by combining the above, it is possible to provide a method of obtaining a signal with n-fold rate of the Nyquist wave in FIG. 8A by performing modulation with carrier frequencies having a two-fold frequency difference of $2^n$ Nyquist frequencies and combining the outputs. This is expressed with the equation below.

$$\begin{aligned}s_{Nyquist-8}(t) &= \sum_{k=1}^{2^n} A\frac{\sin\omega_0 t}{\omega_0 t}\sigma_0(t)\cos(l+k)\omega_0 t \\ &= \sum_{k=1}^{2^{n-1}} A\frac{\sin\omega_0 t}{\omega_0 t}\sigma_0(t)\cos(l-2^{n-2}+k)\omega_0 t + \\ &\quad \sum_{k=2^{n-1}}^{2^n} A\frac{\sin\omega_0 t}{\omega_0 t}\sigma_0(t)\cos(l+2^{n-2}+k)\omega_0 t \\ &= \sum_{k=1}^{2^{n-1}} A\frac{\sin 2\omega_0 t}{2\omega_0 t}\sigma_0(t)\cos(l-2^{n-2}+k)\omega_0 t + \\ &\quad \sum_{k=2^{n-1}}^{2^n} A\frac{\sin 2\omega_0 t}{2\omega_0 t}\sigma_0(t)\cos(l+2^{n-2}+k)\omega_0 t \\ &= \sum_{k=1}^{2^{n-1}} A\frac{\sin 2\omega_0 t}{2\omega_0 t}\sigma_0(t)\cos 2(l+k-1)\omega_0 t + \\ &\quad \sum_{k=1}^{2^{n-1}} A\frac{\sin 2\omega_0 t}{2\omega_0 t}\sigma_0(t)\cos 2(l+k-1)\omega_0 t \\ &\quad A\frac{\sin 2\omega_0 t}{2\omega_0 t}\sigma_0(t)\cos(n-1)\omega_0 t + \\ &\quad A\frac{\sin 2\omega_0 t}{2\omega_0 t}\sigma_0(t)\cos(n+1)\omega_0 t \\ &= A\frac{\sin\omega_0 t}{\omega_0 t}\sigma_0(t)\{\cos(n-1)\omega_0 t + \cos(n+1)\omega_0 t\} \\ &= A\frac{\sin\omega_0 t}{\omega_0 t}\sigma_0(t)2\cos\omega_0 t\cos n\omega_0 t \\ &= 2A\frac{\sin 2\omega_0 t}{2\omega_0 t}\sigma_0(t)\cos n\omega_0 t \\ &= 2A\frac{\sin 2\omega_0 t}{2\omega_0 t}\left\{\frac{\omega_0}{\pi}\frac{\cos\alpha\omega_0 t}{1-\left(\frac{2\alpha\omega_0 t}{\pi}\right)^2}\right\}\cos n\omega_0 t\end{aligned} \qquad (19)$$

Here, orthogonality is expressed between the basic wave and a two-fold rate wave. Orthogonality can be confirmed by cross-correlation. The cross-correlation between these two waves is expressed with the equation below.

$$\int_0^T \left\{A\frac{\sin\omega_0 t}{\omega_0 t}\sigma_0(t)\cos m\omega_0 t \times A\frac{\sin 2\omega_0 t}{2\omega_0 t}\sigma_0(t)\cos m\omega_0 t\right\}dt \qquad (20)$$

When a carrier frequency for modulation is reduced most as basic, that is, m=0, equation (20) becomes the equation below.

$$\int_0^T \left\{ A\frac{\sin\omega_0 t}{\omega_0 t}\sigma_0(t)\cos m\omega_0 t \times A\frac{\sin 2\omega_0 t}{2\omega_0 t}\sigma_0(t)\cos m\omega_0 t \right\} dt = 0 \quad (21)$$

When there is an equal or three-fold frequency shift of $\omega_0$ between the basic wave and the two-fold wave, it is possible to know that they are orthogonal.

In this way, according to the combination method without changing the roll-off inclination of the Nyquist characteristic in the present invention, it is possible to superimpose the multiplied rate wave on the same frequency and substantially improve efficiency of frequency use.

(2) Embodiment 1

Figure 9:
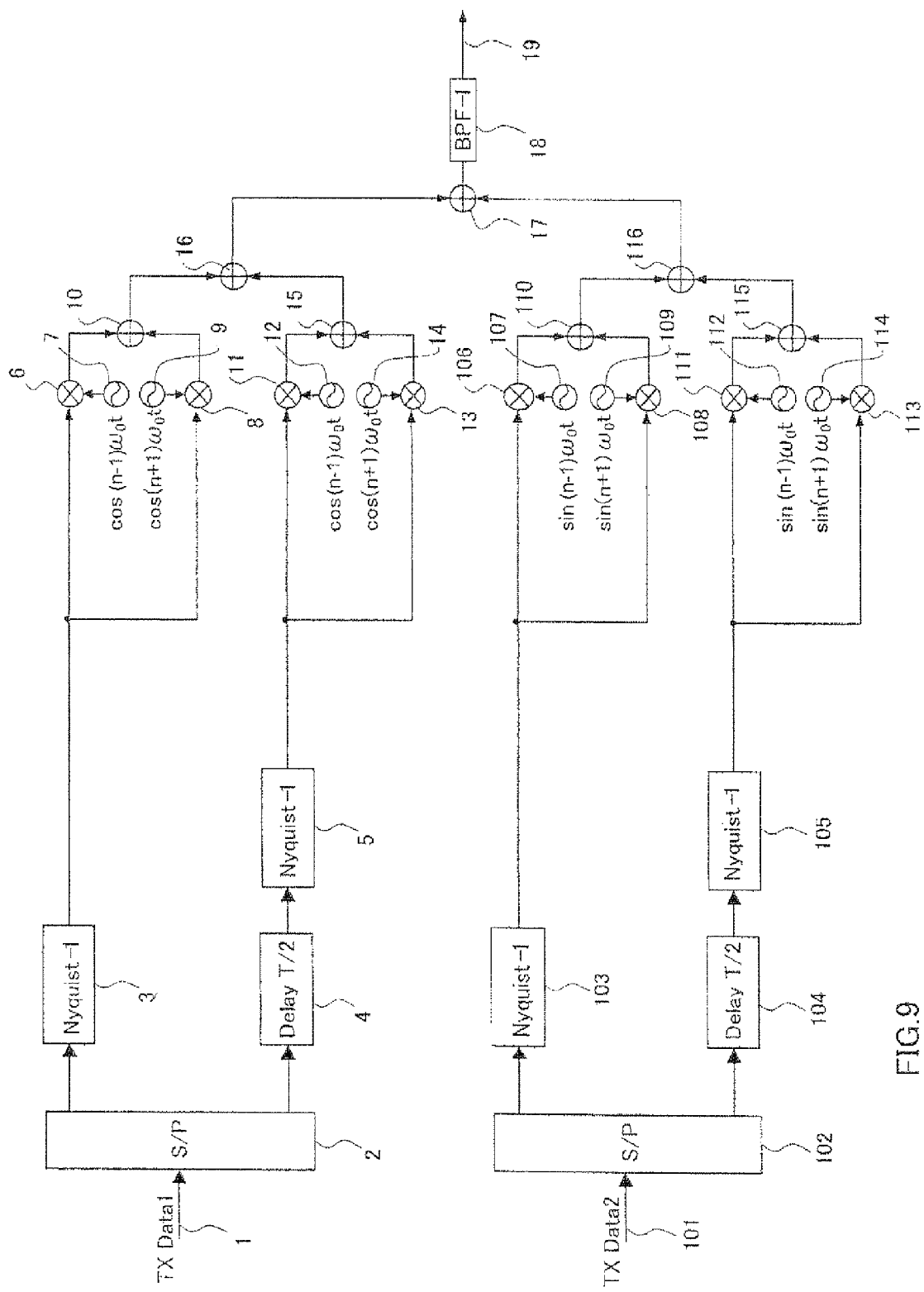
FIG. 9 shows a configuration of the modulation apparatus according to Embodiment 1.

FIG. 9 shows a configuration of the modulation apparatus according to Embodiment 1 for implementing the present invention.

The modulation apparatus in FIG. 9 divides transmission data (TX Data1) 1 into two sequences by serial/parallel converter (S/P) 2, supplies divided data to first Nyquist filter 3, and to second Nyquist filter 5 via delayer 4 which gives a delay of half of symbol period T.

The modulation apparatus performs cosine wave modulation at modulator 6 by multiplying the output of first Nyquist filter 3 by a cosine wave from signal generator 7 which generates the frequency of the n−1th carrier position.

In parallel with this, the modulation apparatus performs cosine wave modulation at modulator 8 by multiplying the output of first Nyquist filter 3 by a cosine wave from signal generator 9 which generates the frequency of the n+1th carrier position. The outputs of modulator 6 and modulator 8 are combined at combiner 10.

In the similar way, the modulation apparatus performs cosine wave modulation at modulator 11 by multiplying the output of second Nyquist filter 5 by a cosine wave from signal generator 12 which generates the frequency of the n−1th carrier position. In parallel with this, the modulation apparatus performs cosine wave modulation at modulator 13 by multiplying the output of second Nyquist filter 5 by a cosine wave from signal generator 14 which generates the frequency of the n+1th carrier position. The outputs of modulator 11 and modulator 13 are combined at combiner 15. Further, the outputs of combiner 10 and combiner 15 are combined at combiner 16.

The outputs of modulation at modulator 6 and modulator 8 are modulation waves of a two-fold rate as expressed in equation (7). At the same time, though a signal supplied from delayer 4 becomes a modulation wave with the two-fold rate at modulator 11 and modulator 13, the signal is subjected to half delay of symbol T at delayer 4, and therefore the modulation output of combiner 10 with the two-fold rate and the modulation output of combiner 15 are combined without intersymbol interference.

Furthermore, the modulation apparatus divides transmission data (TX Data2) 101 into two sequences by serial/parallel converter (S/P) 102, and supplies divided transmission data to third Nyquist filter 103, and to fourth Nyquist filter 105 via delayer 104 that gives a delay of half of symbol period T.

The modulation apparatus performs sine wave modulation at modulator 106 by multiplying the output of third Nyquist filter 103 by a sine wave from signal generator 107 which generates the frequency of the n−1th carrier position. In parallel with this, the modulation apparatus performs sine wave modulation at modulator 108 by multiplying the output of third Nyquist filter 103 by a sine wave from signal generator 109 which generates the frequency of n+1th carrier position. The outputs of modulator 106 and modulator 108 are combined at combiner 110.

In a similar way, the modulation apparatus performs sine wave modulation at modulator 111 by multiplying the output of fourth Nyquist filter 105 by a sine wave from signal generator 112 which generates the frequency of the n−1th carrier position. In parallel with this, the modulation apparatus performs sine wave modulation at modulator 113 by multiplying the output of fourth Nyquist filter 105 by a sine wave from signal generator 114 which generates the frequency of n+1th carrier position. The outputs of modulator 111 and modulator 113 are combined at combiner 115. Further, the outputs of combiner 110 and combiner 115 are combined at combiner 116.

The outputs of modulation at modulator 106 and modulator 108 are modulation waves of a two-fold rate as expressed in equation (7). At the same time, though a signal supplied from delayer 104 becomes a modulation wave of a two-fold rate at modulator 111 and modulator 113, the signal is subjected to half delay of symbol T at delayer 104, and therefore the modulation output of combiner 110 of a two-fold rate and the modulation output of combiner 115 are combined without intersymbol interference.

The outputs of combiner 16 and combiner 116 are combined at combiner 17. This output has unwanted components removed at filter 18 and is transmitted as modulation signal (OFDM signal) 19.

In this way, according to the modulation apparatus of FIG. 9, by providing modulators 6, 8 (11, 13, 106, 108, 111 and 113) that modulate a signal subject to modulation having a Nyquist roll-off frequency characteristic by a carrier frequency having a difference twice the Nyquist frequency, and combiner 10, (15, 110 and 115) that combines the outputs of modulators 6, 8 (11, 13, 106, 108, 111 and 113) and thereby obtains a modulation output having a rate twice the signal subject to modulation and the same Nyquist roll-off inclination as the signal subject to modulation, it is possible to superimpose a multiplied rate wave on the same frequency without changing the roll-off inclination of the Nyquist characteristic, so that it is possible to obtain OFDM signal 19 with substantially improved efficiency of frequency use.

Figure 10:
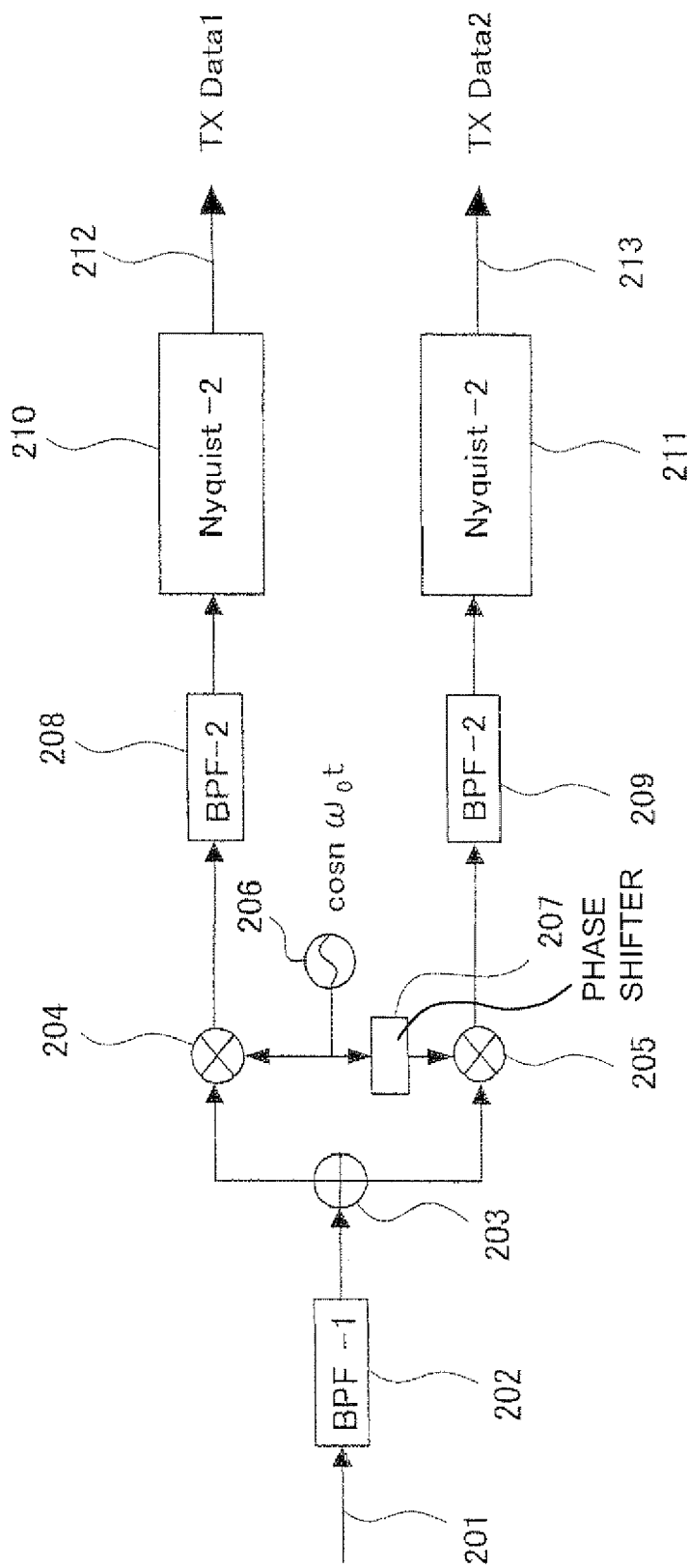
FIG. 10 shows a configuration of the demodulation apparatus according to Embodiment 1.

FIG. 10 shows a configuration of the demodulation apparatus according to Embodiment 1.

The demodulation apparatus in FIG. 10 removes unwanted components of received signal 201 through filter 202, divides the signal at divider 203, and supplies the divided signal to demodulators 204 and 205. The demodulation apparatus performs cosine multiplication at demodulator 204 using the frequency of the nth carrier position generated by signal generator 206 and performs sine multiplication at demodulator 205 by a sine wave obtained through phase shifter 207. The outputs of demodulators 204 and 205 have unwanted components removed through filters 208 and 209, become output signals 212 and 213 with a full Nyquist characteristic through Nyquist filters 210 and 211.

Output signal 212 corresponds to transmission data (TX Data 1) 1, and output signal 213 corresponds to transmission data (TX Data 2) 2. In the transmission system (modulation apparatus), these are first divided into two parallel signals, and therefore the basic rate of the modulation apparatus is half of the transmission data. On the other hand, at the reception system (demodulation apparatus), transmission data is directly demodulated, and therefore the transmission data is extracted with the original rate.

(3) Embodiment 2

Figure 11:
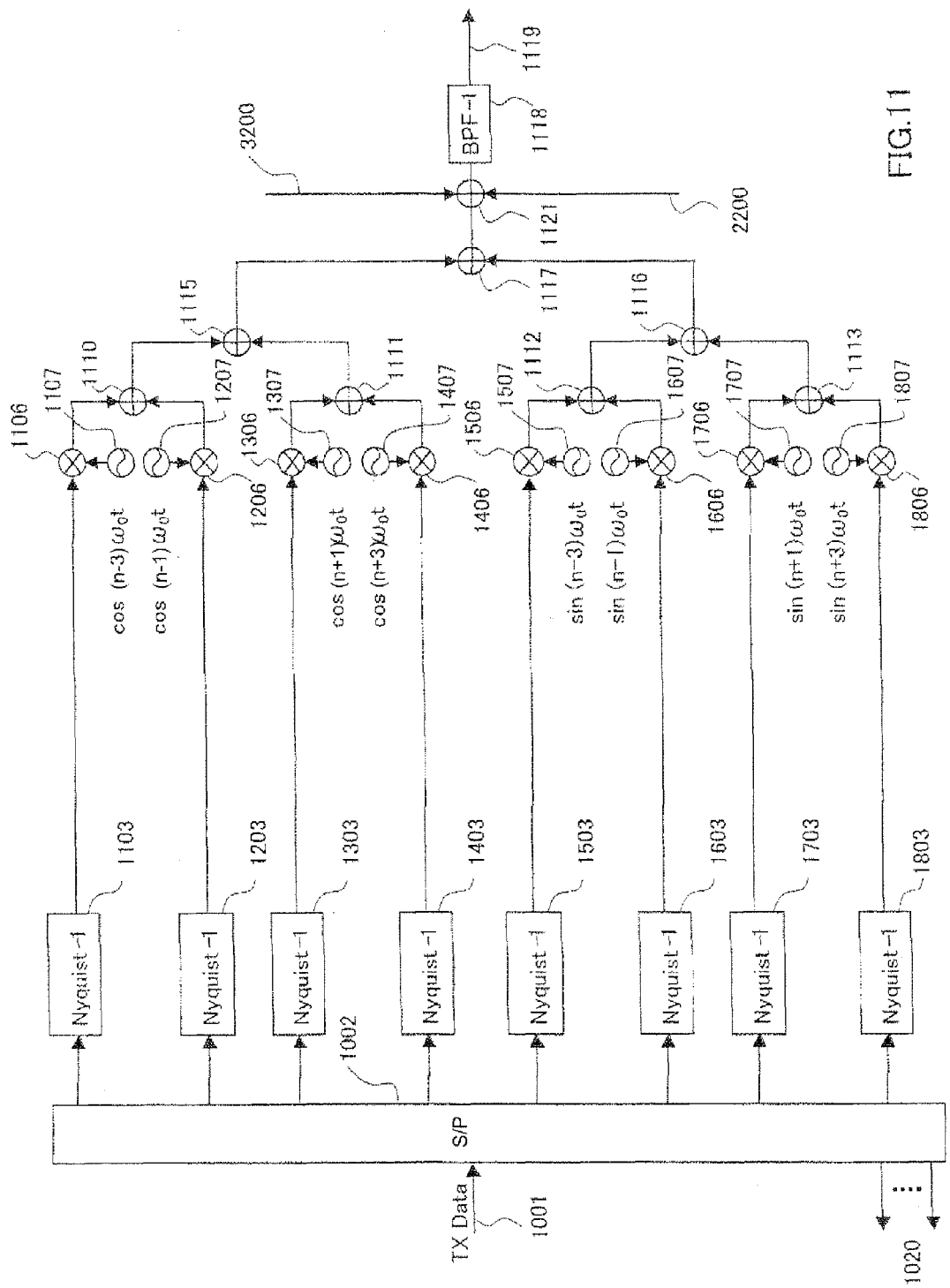
FIG. 11 shows a configuration of a basic rate section (first rate section) of the modulation apparatus according to Embodiment 2.
Figure 12:
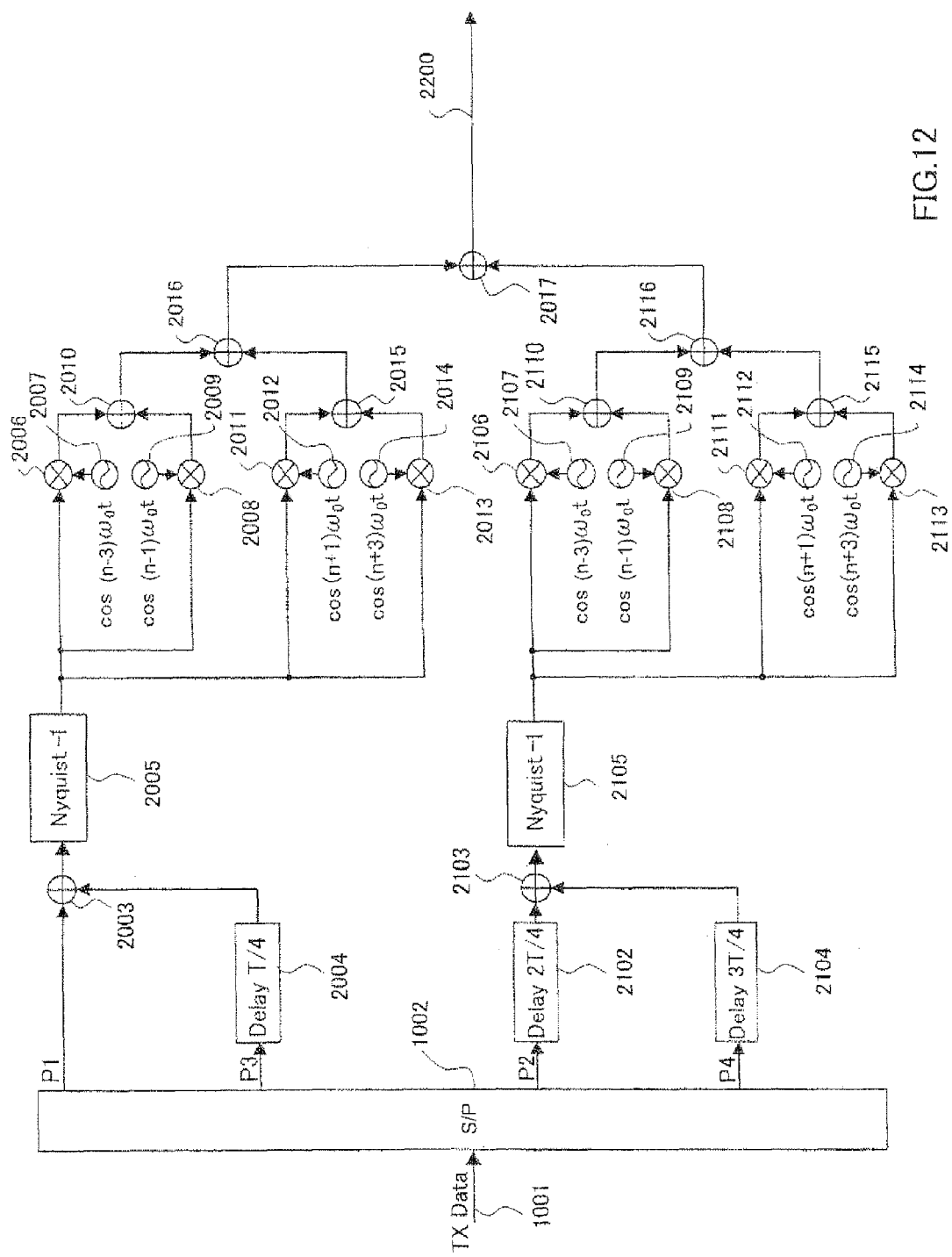
FIG. 12 shows a configuration of a cosine system of a second rate section of the modulation apparatus according to Embodiment 2.
Figure 13:
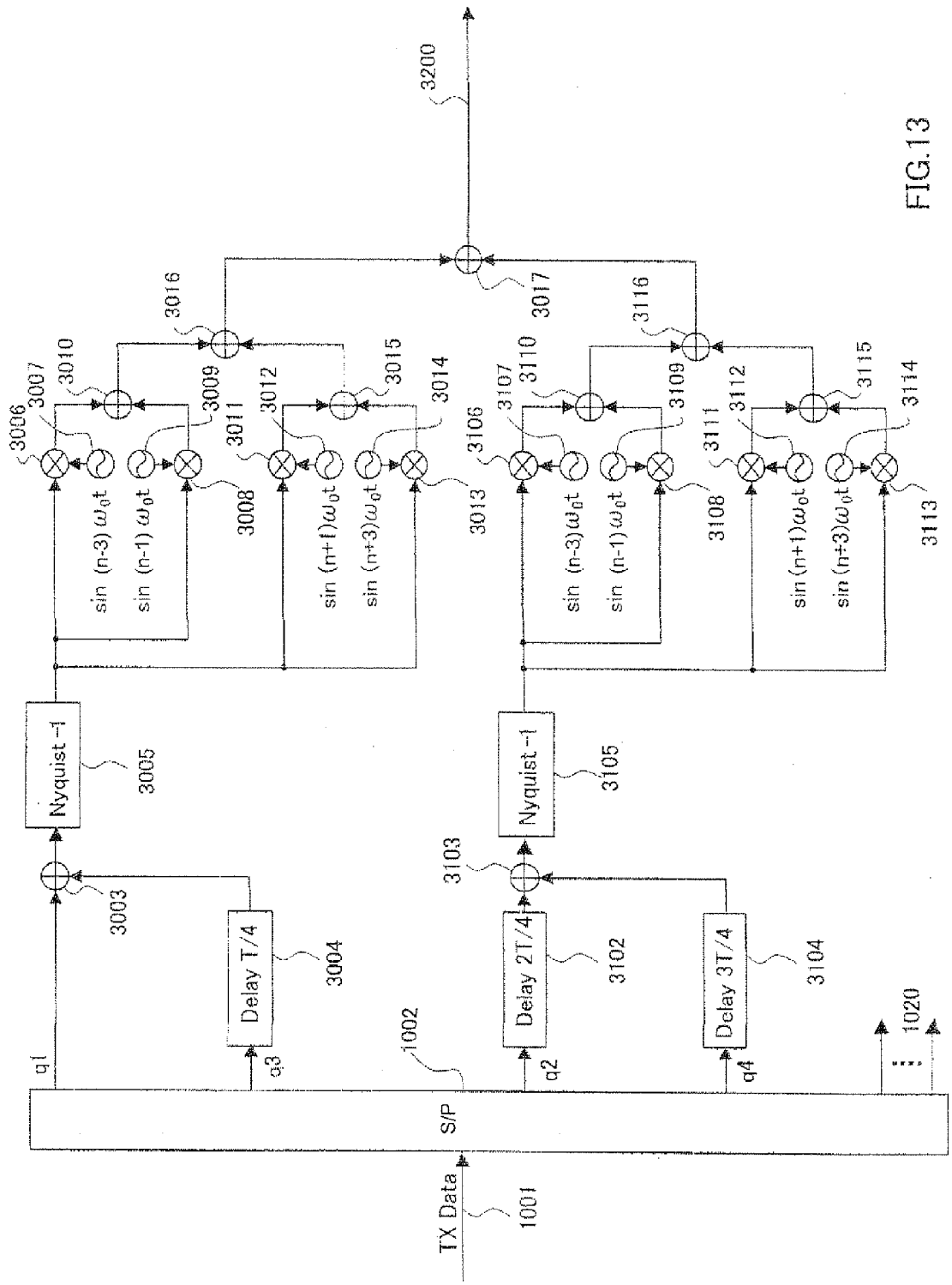
FIG. 13 shows a configuration of a sine system of the second rate section of the modulation apparatus according to Embodiment 2.

FIGS. 11, 12 and 13 show configurations of the modulation apparatus according to Embodiment 2 for implementing the present invention. FIG. 11 shows a basic rate section (first rate section) of the modulation apparatus. FIG. 12 shows a cosine system of a second rate section of the modulation apparatus. FIG. 13 shows a sine system of the second rate section of the modulation system. The OFDM signals obtained from the basic rate section, the cosine system of the second rate section and the sine system of the second rate section, are finally combined as described later.

First, the basic rate section in FIG. 11 will be explained. Transmission data (TX Data) 1001 is divided into eight sequences by serial/parallel converter 1002. The eight sequences are roughly classified into three sequences. That is, the sequences are classified into: the cosine system of the basic system supplied to Nyquist filters 1103, 1203, 1303 and 1403; the sine system of the basic system supplied to Nyquist filters 1503, 1603, 1703 and 1803; and output 1020 for connecting to the system generating a Nyquist signal of a four-fold rate (the cosine system of the second rate section in FIG. 12).

The outputs of Nyquist filters 1103, 1203, 1303 and 1403 of the cosine system of the basic system are supplied to modulators 1106, 1206, 1306 and 1406. Modulators 1106, 1206, 1306 and 1406 receive carrier signals from signal generators 1107, 1207, 1307 and 1407 of $(n-3)\omega_0$, $(n-1)\omega_0$, $(n+1)\omega_0$ and $(n+3)\omega_0$ respectively. Modulators 1106, 1206, 1306 and 1406 perform cosine modulation, and the outputs are combined at combiners 1110, 1111 and 1115 and supplied to combiner 1117.

The outputs of Nyquist filters 1503, 1603, 1703 and 1803 of the sine system of the basic system are supplied to modulators 1506, 1606, 1706 and 1806. Modulators 1506, 1606, 1706 and 1806 receive carrier signals from signal generators 1507, 1607, 1707 and 1807 of $(n-3)\omega_0$, $(n-1)\omega_0$, $(n+1)\omega_0$ and $(n+3)\omega_0$ respectively. Modulators 1506, 1606, 1706 and 1806 perform sine modulation, and the outputs are combined at combiners 1112, 1113 and 1116 and supplied to combiner 1117. That is, the outputs of the two sequences are combined at combiner 1117.

The output of combiner 1117 is combined at subsequent combiner 1121 with signal 2200 obtained from the cosine system of the second rate section in FIG. 12 and signal 3200 obtained from the sine system of the second rate section in FIG. 13. The output signal of combiner 1121 in which signals of unwanted band are removed through filter 1118, becomes modulation output (OFDM signal) 1119.

A part of output 1020 of the above-described serial/parallel converter 1002 in FIG. 11 is converted to signals P1, P2, P3 and P4 shown in FIG. 12. Next, the cosine system of the second rate section in FIG. 12 will be explained. In Embodiment 2, the second modulation rate is four fold. The second rate section shown in FIG. 12 generates a band signal of a four-fold rate. Signal P1, and signal P3 subjected to quarter delay of symbol rate T at delayer 2004 are combined at combiner 2003 and inputted to Nyquist filter 2005. The output of Nyquist filter 2005 is supplied to four modulators 2006, 2008, 2011 and 2013 at the same time. Modulators 2006, 2008, 2011 and 2013 receive carrier signals from signal generators 2007, 2009, 2012 and 2014 of $(n-3)\omega_0$, $(n-1)\omega_0$, $(n+1)\omega_0$ and $(n+3)\omega_0$ respectively. Modulators 2006, 2008, 2011 and 2013 perform cosine modulation, and the outputs are combined at combiners 2010, 2015 and 2016 and supplied to combiner 2017.

Signal P2 is subjected to two-fourth delay of symbol rate T at delayer 2102, and signal P4 is subjected to three-quarter delay of symbol rate T at delayer 2104. The two delayed signals are combined at combiner 2103 and inputted to Nyquist filter 2105. The output of Nyquist filter 2105 is supplied to four modulators 2106, 2108, 2111 and 2113 at the same time. Modulators 2106, 2108, 2111 and 2113 receive carrier signals from signal generators 2107, 2109, 2112 and 2114 of $(n-3)\omega_0$, $(n-1)\omega_0$, $(n+1)\omega_0$ and $(n+3)\omega_0$ respectively. Modulators 2106, 2108, 2111 and 2113 perform cosine modulation, and the outputs are combined at combiner 2110, 2115 and 2116 and supplied to combiner 2017. Modulation signal (OFDM signal) 2200 with a four-fold rate obtained by combination at combiner 2017 is supplied to combiner 1121 in FIG. 11.

Part of output 1020 of the above-described serial/parallel converter 1002 in FIG. 11 is converted to signals q1, q2, q3 and q4 shown in FIG. 13. Next, the sine system of the second rate section in FIG. 13 will be explained. As described above, in Embodiment 2, the second modulation rate is four fold. The second rate section shown in FIG. 13 generates a band signal of a four-fold rate. Signal q1, and signal q3 subjected to quarter delay of symbol rate T at delayer 3004 are combined at combiner 3003 and inputted to Nyquist filter 3005. The output of Nyquist filter 3005 is supplied to four modulators 3006, 3008, 3011 and 3013 at the same time. Modulators 3006, 3008, 3011 and 3013 receive carrier signals from signal generators 3007, 3009, 3012 and 3014 of $(n-3)\omega_0$, $(n-1)\omega_0$, $(n+1)\omega_0$ and $(n+3)\omega_0$ respectively. Modulators 3006, 3008, 3011 and 3013 perform sine modulation, and the outputs are combined at combiners 3010, 3015 and 3016 and supplied to combiner 3017.

Signal q2 is subjected to two-fourth delay of symbol rate T at delayer 3102, and signal q4 is subjected to three-quarter delay of symbol rate T at delayer 3104. The two delayed signals are combined at combiner 3103 and inputted to Nyquist filter 3105. The output of Nyquist filter 3105 is supplied to four modulators 3106, 3108, 3111 and 3113 at the same time. Modulators 3106, 3108, 3111 and 3113 receive carrier signals from signal generators 3107, 3109, 3112 and 3114 of $(n-3)\omega_0$, $(n-1)\omega_0$, $(n+1)\omega_0$ and $(n+3)\omega_0$ respectively. Modulators 3106, 3108, 3111 and 3113 perform sine modulation, and the outputs are combined at combiners 3110, 3115 and 3116 and supplied to combiner 3017. Modulation signal (OFDM signal) 3200 with a four-fold rate obtained by combination at combiner 3017 is supplied to combiner 1121 in FIG. 11.

The modulation (OFDM) outputs of these three sequences are combined at combiner 1121 in FIG. 11. The modulation output (output of combiner 1117) of the basic system shown in FIG. 11 corresponds to four waves of the center in FIG. 8A. Further, modulation outputs 2200 and 3200 with an increased rate shown in FIGS. 12 and 13 correspond to one wave in FIG. 8C. Both center frequencies are $n\omega_0$.

In this way, two types of modulation waves having different rates are arranged in the same frequency band.

According to the modulation apparatus shown in FIGS. 11, 12 and 13, by providing: a basic rate modulation section that forms a basic rate modulation signal (output signal of combiners 1110, 1111, 1112, 1113, 1115, 1116 and 1117) by modulating a first signal subject to modulation having a Nyquist roll-off frequency characteristic by a carrier frequency having a difference twice the Nyquist frequency; a four-fold rate modulation section that forms a four-fold rate modulation signal by modulating a second signal subject to modulation having the same Nyquist frequency characteristic as the first signal subject to modulation by a carrier frequency having a difference eight fold the Nyquist frequency; and combiner 1121 that combines the basic rate modulation signal and a four-fold rate modulation signal, it is possible to superimpose the four-fold rate modulation signal on the basic rate modulation signal on the same frequency without changing a Nyquist characteristic roll-off inclination, so that combiner 1121 can obtain modulation signal (OFDM signal) 1119 in which diffusion of the frequency bandwidth is suppressed and capable of transmitting more data than Embodiment 1.

In this embodiment, a case has been described where the four-fold rate modulation signal is superimposed on the basic rate modulation signal, but this is by no means limiting. By providing: a basic rate modulation section that forms a basic modulation signal by modulating a first signal subject to modulation having a Nyquist roll-off frequency characteristic by a carrier frequency having a difference twice the Nyquist frequency; a $2^n$-fold rate modulation section that forms a $2^n$-fold rate modulation signal by modulating a second signal subject to modulation having the same Nyquist roll-off frequency characteristic as the first signal subject to modulation and having a rate $2^n$ ($n \geq 2$) fold the first signal subject to modulation by a carrier frequency having a difference $2^{n+1}$ fold the Nyquist frequency; and a combination section that combines the basic rate modulation signal and $2^n$-fold rate modulation signal, it is possible to superimpose the $2^n$-fold rate modulation signal on the basic rate modulation signal on the same frequency.

Here, whether such multiplexing is possible will be logically examined. When a function indicating a roll-off part is $\sigma_0(t)$, $\sigma_0(t)$ can be expressed with the equation below.

$$\sigma_0(t) = \frac{\omega_0}{\pi}\left[\frac{1}{1-\left(\frac{2\alpha\omega_0 t}{\pi}\right)^2}\right] \quad (22)$$

Where, in equation (22), $\alpha$ is a roll-off factor taking a value larger than zero and one at maximum.

The examination for preventing the occurrence of interference even when signals are superimposed, is possible by looking at the cross-correlation function of the signals. In the scheme of the present invention with the same absolute inclination width of the roll-off sections, the cross-correlation function between the Nyquist wave of the basic rate and the Nyquist wave of a two-fold rate will be considered.

When the respective carrier frequencies are $m\omega_0$ and $n\omega_0$, the cross-correlation function can be obtained with the equation below, where m and n are integers.

$$\int_0^T \left\{A\frac{\sin\omega_0 t}{\omega_0 t}\sigma_0(t)\cos m\omega_0 t \times A\frac{\sin 2\omega_0 t}{2\omega_0 t}\sigma_0(t)\cos(m+n)\omega_0 t\right\}dt \quad (23)$$

Here, by equally performing frequency conversion on the carrier frequencies, one of the carrier frequencies can be decreased to DC band. That is, when m=0, equation (23) becomes the equation below.

$$\int_0^T \left\{(A\sigma_0(t))^2 \frac{\sin\omega_0 t}{\omega_0 t} \times \frac{\sin 2\omega_0 t}{2\omega_0 t}\cos n\omega_0\right\}dt \quad (24)$$

When equation (24) is expanded, the following equation holds.

$$\int_0^T \left\{(A\sigma_0(t))^2 \frac{\sin 2\omega_0 t}{2(\omega_0 t)^2}\{\sin(n+1)\omega_0 t + (-1)^k\sin(n-1)\omega_0 t\}dt \quad (25)$$

Here, in equation (25), k is 1 when $n \geq 2$, and 0 when n<2 from the addition theorem for the sine function. That is, the right side of the above-described cross-correlation function is a sum of or difference between sine wave functions, and so the requirement for an integration value as a cross-correlation function to be zero, is that the relationship of two terms of the sine wave functions becomes difference. That is, under the condition of $n \geq 2$, the following equation holds.

$$\int_0^T \left\{(A\sigma_0(t))^2 \frac{\sin 2\omega_0 t}{2(\omega_0 t)^2}\{\sin(n+1)\omega_0 t - \sin(n-1)\omega_0 t\}dt \quad (26)$$

Figure 15:
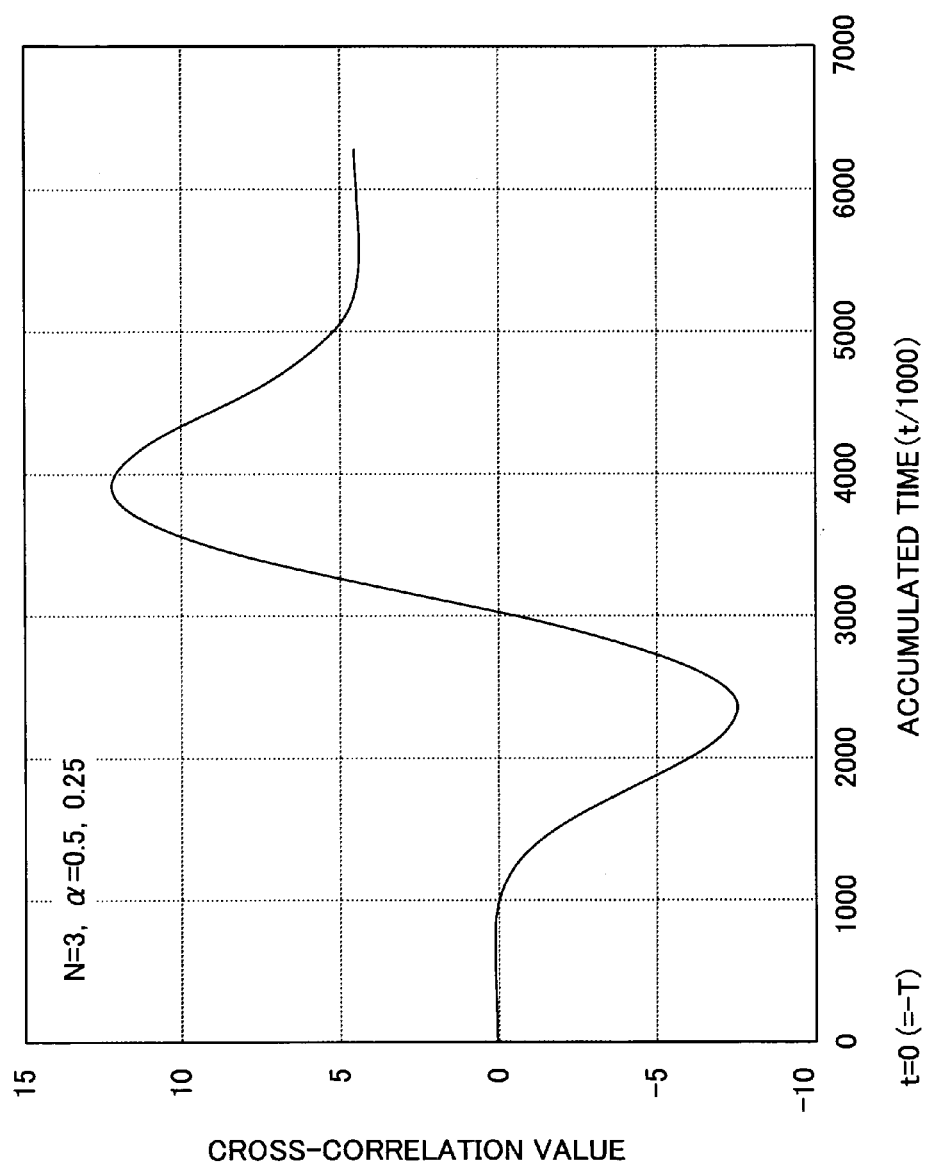
FIG. 15 shows a characteristic of a cross-correlation function between subcarriers having a two-fold rate difference.

Since n is an odd value in fact, when the examination is performed in the case of n=3, cross-correlation indicates the characteristic shown in FIG. 15. FIG. 15 shows a characteristic of cross-correlation between subcarriers having a two-fold rate difference, in the case where roll-off factor $\alpha$ of the basic rate side is 0.5 and roll-off factor $\alpha$ of the two-fold rate side is 0.25 as an example. At the position of zero, $t=\pi$, that is, one symbol period. By this means, it is verified that mutual interference does not occur between Nyquist waves of different rates on condition that the center frequencies are separated by $3\omega_0$ or more.

This means that, according to the scheme of the present invention, though subcarriers can be superimposed in a multilayered way, the center frequencies must be separated by $3\omega_0$ or more. Therefore, the maximum multiplex efficiency is up to a two-fold compared to one-layered OFDM.

Figure 14:
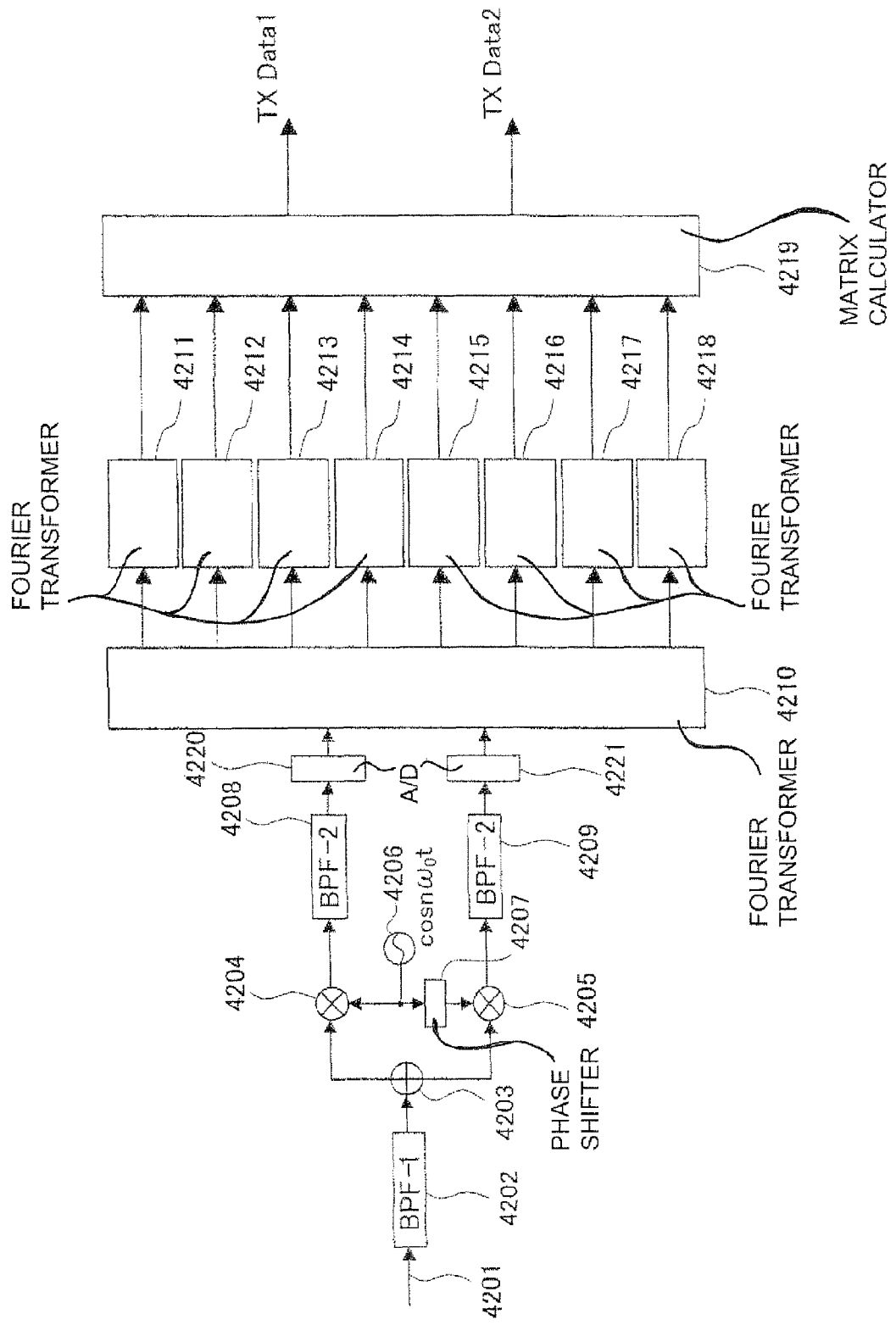
FIG. 14 shows a configuration of the demodulation apparatus according to Embodiment 2.

FIG. 14 shows a configuration of the demodulation apparatus for the above-described modulation signal.

After removing unwanted frequency components of received signal 4201 through filter 4202, the demodulation apparatus of FIG. 14 divides the result at divider 4203 and inputs to the quadrature demodulator. A signal of center frequency $n\omega_0$ is supplied from signal generator 4206 to demodulator 4204 by a cosine wave and demodulator 4205 by a sine wave configuring the quadrature demodulator. The signal of center frequency $n\omega_0$ is supplied from signal generator 4206 via phase shifter 4207 to demodulator 4205 by the sine wave.

The signals demodulated by demodulators 4204 and 4205, in which unwanted frequency components are removed through filters 4208 and 4209, are converted to digital signals by analog-digital converters 4220 and 4221.

This digital signal group is inputted to first Fourier transformer 4210 as a complex digital signal. As a result, complex output corresponding to frequencies $(n-3)\omega_0$, $(n-1)\omega_0$, $(n+1)\omega_0$ and $(n+3)\omega_0$ is extracted by first Fourier transformer 4210. These signals are supplied to second Fourier transformer groups 4211, 4212, 4213, 4214, 4215, 4216, 4217 and 4218, and the superimposed components with different rates are separated. These signal outputs are adjusted to a desired data group by matrix calculator 4219, and finally outputted as transmission data groups TX Data1 and TX Data 2 with a restored transfer rate of the transmission system. The present application is based on Japanese Patent Application No. 2004-155153, filed on May 25, 2004, and Japanese Patent Application No. 2004-206391, filed on Jul. 13, 2004, the entire content of which is expressly incorporated herein by reference.

INDUSTRIAL APPLICABILITY

The present invention relates to a modulation apparatus, modulation method and demodulation apparatus, provides an advantage of forming an OFDM signal with substantially increased efficiency of frequency use, and is broadly applicable to wireless communication such as a mobile communication system and wireless LAN (Local Area Network).

The invention claimed is:

1. A modulation apparatus comprising:
a Nyquist filter;
a first modulation section that multiplies an output of the Nyquist filter with a first carrier wave;
a second modulation section that multiplies an output of the Nyquist filter with a second carrier wave; and
a combination section that combines an output of the first modulation section and an output of the second modulation section, wherein:
a frequency of the first carrier wave is an integral multiple of a Nyquist frequency of the Nyquist filter, and
a frequency of the second carrier wave is a sum of the frequency of the first carrier wave and twice the Nyquist frequency.

2. The modulation apparatus according to claim 1, wherein a plurality of modulation signals obtained from the combination section are disposed and arranged on a frequency axis.

3. A demodulation apparatus comprising a quadrature demodulator that quadrature demodulates a modulation signal obtained from the modulation apparatus according to claim 1.

4. A modulation apparatus comprising:
a basic rate modulation section that obtains a basic rate modulation signal;
a $2^n$-fold rate modulation section that obtains a $2^n$-fold rate modulation signal, n being an integer of two or more; and
a first combination section that combines the basic rate modulation signal and the $2^n$-fold rate modulation signal, wherein:
the basic rate modulation section comprises:
a Nyquist filter;
a first modulation section that multiplies an output of the Nyquist filter with a first carrier wave;
a second modulation section that multiplies the output of the Nyquist filter with a second carrier wave; and
a second combination section that combines an output of the first modulation section and an output of the second modulation section, and thereby obtains the basic rate modulation signal; and
the $2^n$-fold rate modulation section comprises:
a modulated wave forming section that forms as a modulated wave a Nyquist wave having a same roll-off factor as an output of the Nyquist filter and having a rate $2^n$ ($n \geq 2$) fold the output of the Nyquist filter;
a third modulation section that multiplies an output of the modulated wave forming section with a third carrier wave;
a fourth modulation section that multiplies the output of the modulated wave forming section with a fourth carrier wave; and
a third combination section that combines an output of the third modulation section and an output of the fourth modulation section, and thereby obtains the $2^n$-fold rate modulation signal, wherein:
a frequency of the first carrier wave is an integral multiple of a Nyquist frequency of the Nyquist filter and a frequency of the second carrier wave is a sum of the frequency of the first carrier wave and twice the Nyquist frequency; and
a frequency of the third carrier wave is an integral multiple of a Nyquist frequency of the Nyquist filter and a frequency of the fourth carrier wave is a sum of the frequency of the third carrier wave and $2^{n+1}$ fold the Nyquist frequency.

5. A demodulation apparatus comprising:
a quadrature demodulator that quadrature demodulates a signal obtained from the first combination section of the modulation apparatus according to claim 4; and
a Fourier transform section that extracts signals subject to modulation of different rates by Fourier transforming a quadrature demodulated signal.

6. A modulation method comprising:
a step of fanning a Nyquist wave;
a first modulation step of multiplying the Nyquist wave with a first carrier wave;
a second modulation step of multiplying the Nyquist wave with a second carrier wave; and
a combination step of combining an output of the first modulation step and an output of the second modulation step, wherein:
a frequency of the first carrier wave is an integral multiple of a Nyquist frequency of the Nyquist filter, and
a frequency of the second carrier wave is a sum of the frequency of the first carrier wave and twice the Nyquist frequency.

7. A modulation method comprising:
a basic rate modulation step of obtaining a basic rate modulation signal;
a $2^n$-fold rate modulation step of obtaining a $2^n$-fold rate modulation signal, n being an integer of two or more; and
a first combination step of combining the basic rate modulation signal and the $2^n$-fold rate modulation signal, wherein:
the basic rate modulation step comprises:
a step of forming a Nyquist wave;
a first modulation step of multiplying the Nyquist wave with a first carrier wave;
a second modulation step of multiplying the Nyquist wave with a second carrier wave; and
a second combination step of combining an output of the first modulation step and an output of the second modulation step; and
the $2^n$-fold rate modulation step comprises:
a modulated wave forming step of forming as a modulated wave a Nyquist wave having a same roll-off factor as an output of the Nyquist filter and having a rate $2^n$ ($n \geq 2$) fold the output of the Nyquist filter;
a third modulation step of multiplying the modulated wave with a third carrier wave;
a fourth modulation step of multiplying the modulated wave with a fourth carrier wave; and
a third combination step of combining an output of the third modulation step and an output of the fourth modulation step, and thereby obtaining the $2^n$-fold rate modulation signal, wherein:

a frequency of the first carrier wave is an integral multiple of a Nyquist frequency of the Nyquist filter and a frequency of the second carrier wave is a sum of the frequency of the first carrier wave and twice the Nyquist frequency; and a frequency of the third carrier wave is an integral multiple of a Nyquist frequency of the Nyquist filter and a frequency of the fourth carrier wave is a sum of the frequency of the third carrier wave and $2^{n+1}$ fold the Nyquist frequency.

* * * * *